US009244798B1

(12) United States Patent
Kuila et al.

(10) Patent No.: US 9,244,798 B1
(45) Date of Patent: Jan. 26, 2016

(54) PROGRAMMABLE MICRO-CORE PROCESSORS FOR PACKET PARSING WITH PACKET ORDERING

(75) Inventors: Kaushik Kuila, San Jose, CA (US); David T. Hass, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/164,533

(22) Filed: Jun. 20, 2011

(51) Int. Cl.
*G06F 3/00* (2006.01)
*G06F 11/30* (2006.01)
*G06F 3/038* (2013.01)

(52) U.S. Cl.
CPC ............ *G06F 11/3013* (2013.01); *G06F 3/038* (2013.01); *G06F 2221/2121* (2013.01)

(58) Field of Classification Search
CPC ............... G06F 11/3013; G06F 3/038; G06F 2221/2121; G06F 3/00; G06F 3/48; G06F 7/00; G06F 9/22; G06F 9/50
USPC .............................................. 710/20, 4, 7, 21
See application file for complete search history.

(56) References Cited

U.S. PATENT DOCUMENTS

| | | | | |
|---|---|---|---|---|
| 4,730,259 | A * | 3/1988 | Gallant | 706/16 |
| 5,170,463 | A * | 12/1992 | Fujimoto et al. | 706/41 |
| 5,995,971 | A * | 11/1999 | Douceur et al. | 1/1 |
| 6,513,108 | B1 * | 1/2003 | Kerr et al. | 712/19 |
| 6,791,983 | B1 * | 9/2004 | Bergantino et al. | 370/392 |
| 6,792,575 | B1 * | 9/2004 | Samaniego et al. | 715/202 |
| 7,174,540 | B2 * | 2/2007 | Ondrusek et al. | 717/120 |
| 7,249,208 | B2 * | 7/2007 | Aslot et al. | 710/104 |
| 7,475,200 | B1 * | 1/2009 | Melvin | 711/154 |
| 7,506,104 | B1 * | 3/2009 | Melvin | 711/118 |
| 7,546,371 | B1 * | 6/2009 | Cheng et al. | 709/227 |
| 7,739,452 | B2 * | 6/2010 | Melvin | 711/118 |
| 7,930,408 | B1 * | 4/2011 | Cheng et al. | 709/227 |
| 7,990,867 | B1 * | 8/2011 | Keller et al. | 370/235 |
| 2003/0182518 | A1 * | 9/2003 | Nakanishi | 711/153 |
| 2004/0103182 | A1 | 5/2004 | Krabel et al. | |
| 2006/0112190 | A1 * | 5/2006 | Hulten et al. | 709/238 |
| 2006/0179267 | A1 * | 8/2006 | Chatterjee et al. | 712/11 |
| 2006/0221850 | A1 | 10/2006 | Buckley et al. | |
| 2006/0230375 | A1 * | 10/2006 | Casey et al. | 716/8 |
| 2008/0250232 | A1 * | 10/2008 | Nakashima | 712/225 |
| 2009/0073981 | A1 | 3/2009 | Coyte et al. | |
| 2009/0285228 | A1 | 11/2009 | Bagepalli et al. | |
| 2010/0036997 | A1 * | 2/2010 | Brewer et al. | 711/5 |
| 2011/0164140 | A1 | 7/2011 | Venna et al. | |
| 2012/0033673 | A1 | 2/2012 | Goel | |

(Continued)

OTHER PUBLICATIONS

U.S. Appl. No. 13/107,809, filed May 13, 2011, entitled "Implementing Integrated Networking Functions at Wire Speed".

(Continued)

*Primary Examiner* — Idriss N Alrobaye
*Assistant Examiner* — Getente A Yimer
(74) *Attorney, Agent, or Firm* — Sterne, Kessler, Goldstein & Fox PLLC

(57) ABSTRACT

Disclosed is an approach for implementing a flexible parser for a networking system. A micro-core parser is implemented to process packets in a networking system. The micro-cores of the parser read the packet headers, and perform any suitably programmed tasks upon those packets and packet headers. One or more caches may be associated with the micro-cores to hold the packet headers. A dependency list is used to maintain proper ordering of packets being processed by the micro-cores.

12 Claims, 24 Drawing Sheets

(56) References Cited

U.S. PATENT DOCUMENTS

2012/0236756 A1 9/2012 Bennett et al.
2013/0286860 A1 10/2013 Dorenbosch et al.

OTHER PUBLICATIONS

Kuila, K. et al., U.S. Appl. No. 13/164,521, filed Jun. 20, 2011, entitled "Programmable Micro-Core Processors for Packet Parsing".

Office Action, dated May 13, 2013, for U.S. Appl. No. 13/164,521, filed Jun. 20, 2011, 6 pages.
Office Action, dated Sep. 25, 2013, for U.S. Appl. No. 13/164,521, filed Jun. 20, 2011, 9 pages.
Office Action, dated Mar. 10, 2014, for U.S. Appl. No. 13/164,521, filed Jun. 20, 2011, 10 pages.

\* cited by examiner

Fig. 5B

| | μCore 15 | μCore 14 | μCore 13 | μCore 12 | μCore 11 | μCore 10 | μCore 9 | μCore 8 | μCore 7 | μCore 6 | μCore 5 | μCore 4 | μCore 3 | μCore 2 | μCore 1 | μCore 0 |
|---|---|---|---|---|---|---|---|---|---|---|---|---|---|---|---|---|
| μCore 0 | | | | | | | | | | | | | | | | 0 |
| μCore 1 | | | | | | | | | | | | | | | | 0 |
| μCore 2 | | | | | | | | | | | | | | | | 0 |
| μCore 3 | | | | | | | | | | | | | | | | 0 |
| μCore 4 | | | | | | | | | | | | | | | | 0 |
| μCore 5 | | | | | | | | | | | | | | | | 0 |
| μCore 6 | | | | | | | | | | | | | | | | 0 |
| μCore 7 | | | | | | | | | | | | | | | | 0 |
| μCore 8 | | | | | | | | | | | | | | | | 0 |
| μCore 9 | | | | | | | | | | | | | | | | 0 |
| μCore 10 | | | | | | | | | | | | | | | | 0 |
| μCore 11 | | | | | | | | | | | | | | | | 0 |
| μCore 12 | | | | | | | | | | | | | | | | 0 |
| μCore 13 | | | | | | | | | | | | | | | | 0 |
| μCore 14 | | | | | | | | | | | | | | | | 0 |
| μCore 15 | | | | | | | | | | | | | | | | 0 |

500

504

| | µCore 15 | µCore 14 | µCore 13 | µCore 12 | µCore 11 | µCore 10 | µCore 9 | µCore 8 | µCore 7 | µCore 6 | µCore 5 | µCore 4 | µCore 3 | µCore 2 | µCore 1 | µCore 0 |
|---|---|---|---|---|---|---|---|---|---|---|---|---|---|---|---|---|
| µCore 0 | | | | | | | | | 1 | | | | | | | 0 |
| µCore 1 | | | | | | | | | 0 | | | | | | | 0 |
| µCore 2 | | | | | | | | | 0 | | | | | | | 0 |
| µCore 3 | | | | | | | | | 0 | | | | | | | 0 |
| µCore 4 | | | | | | | | | 0 | | | | | | | 0 |
| µCore 5 | | | | | | | | | 0 | | | | | | | 0 |
| µCore 6 | | | | | | | | | 0 | | | | | | | 0 |
| µCore 7 | | | | | | | | | 0 | | | | | | | 0 |
| µCore 8 | | | | | | | | | 0 | | | | | | | 0 |
| µCore 9 | | | | | | | | | 0 | | | | | | | 0 |
| µCore 10 | | | | | | | | | 0 | | | | | | | 0 |
| µCore 11 | | | | | | | | | 0 | | | | | | | 0 |
| µCore 12 | | | | | | | | | 0 | | | | | | | 0 |
| µCore 13 | | | | | | | | | 0 | | | | | | | 0 |
| µCore 14 | | | | | | | | | 0 | | | | | | | 0 |
| µCore 15 | | | | | | | | | 0 | | | | | | | 0 |

| | μCore 15 | μCore 14 | μCore 13 | μCore 12 | μCore 11 | μCore 10 | μCore 9 | μCore 8 | μCore 7 | μCore 6 | μCore 5 | μCore 4 | μCore 3 | μCore 2 | μCore 1 | μCore 0 |
|---|---|---|---|---|---|---|---|---|---|---|---|---|---|---|---|---|
| μCore 0 | 0 | | | 1 | | | | 1 | | | | | | | | 0 |
| μCore 1 | | | | 0 | | | | 0 | | | | | | | | 0 |
| μCore 2 | | | | 0 | | | | 0 | | | | | | | | 0 |
| μCore 3 | | | | 0 | | | | 0 | | | | | | | | 0 |
| μCore 4 | | | | 0 | | | | 0 | | | | | | | | 0 |
| μCore 5 | | | | 0 | | | | 0 | | | | | | | | 0 |
| μCore 6 | | | | 0 | | | | 0 | | | | | | | | 0 |
| μCore 7 | | | | 1 | | | | 0 | | | | | | | | 0 |
| μCore 8 | | | | 0 | | | | 0 | | | | | | | | 0 |
| μCore 9 | | | | 0 | | | | 0 | | | | | | | | 0 |
| μCore 10 | | | | 0 | | | | 0 | | | | | | | | 0 |
| μCore 11 | | | | 0 | | | | 0 | | | | | | | | 0 |
| μCore 12 | | | | 0 | | | | 0 | | | | | | | | 0 |
| μCore 13 | | | 0 | 0 | | | | 0 | | | | | | | | 0 |
| μCore 14 | | | | 0 | | | | 0 | | | | | | | | 0 |
| μCore 15 | | | | 0 | | | | 0 | | | | | | | | 0 |

500
504
506
507
508
509

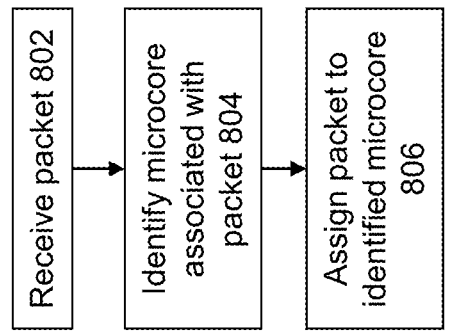

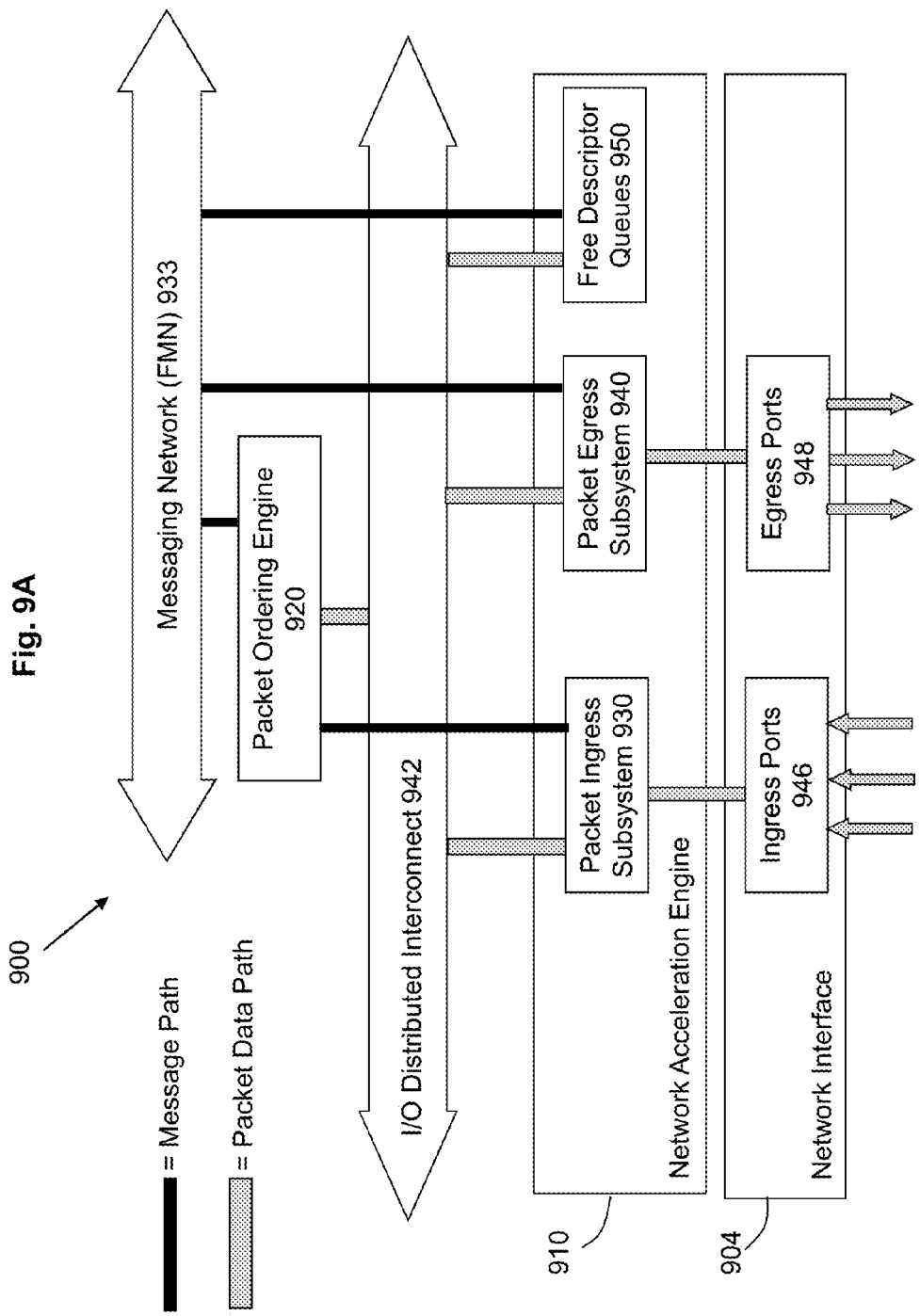

PROGRAMMABLE MICRO-CORE PROCESSORS FOR PACKET PARSING WITH PACKET ORDERING

FIELD

The present disclosure is directed towards circuits for network traffic processing.

BACKGROUND

To support high performance networking, networking components within computing and telecommunications systems must be able to effectively process numerous different flows (e.g. groups of packets originating from a common source). As performance expectations for such systems increase over time, these systems are challenged to implement more and more complex packet-handling tasks at ever greater speeds.

One common task to be handled in order to implement a networking system is to process and analyze the packets in a communications flow. A parser is used to review the header of the packet, which allows the communications system to understand how that packet should be directed and handled. Accordingly, there is a need for an improved approach to implement a parser for networking systems.

SUMMARY

An approach is described for implementing a flexible parser for a networking system. According to some embodiments, a micro-core parser is implemented to process packets in a networking system where a dependency list is used to maintain proper ordering of the packets being processed by the micro-cores. The micro-cores of the parser read the packet headers, and perform any suitably programmed tasks upon those packets and packet headers. One or more caches may be associated with the micro-cores to hold the packet headers.

Other and additional objects, features, and advantages are described in the detailed description, figures, and claims.

BRIEF DESCRIPTION OF THE DRAWINGS

FIGS. 5A-D provide an illustrative example for adding information to a dependency list structure.

FIGS. 7A-G provide an illustrative example for using a dependency list structure.

FIG. 8 shows a flowchart of an approach for allocating packets to a specific micro-core in accordance with some embodiments.

FIGS. 9A and 9B illustrate example systems in which a micro-core based parser may be employed.

DETAILED DESCRIPTION

Embodiments of the present invention will now be described in detail with respect to the drawings, which are provided as illustrative examples. Notably, the figures and examples below are not meant to limit the scope of the embodiments to a single embodiment, but other embodiments are possible by way of interchange of some or all of the described or illustrated embodiments. Whenever convenient, the same reference numbers will be used throughout the drawings to refer to the same or like parts. Where certain elements of these embodiments can be partially or fully implemented using known components, only those portions of known components that are necessary for understanding of the embodiment will be described, and details descriptions of other portions of such known components will be omitted so as to not obscure the description. In the present specification, an embodiment showing a singular component should not be considered to be limiting; rather, other embodiments may include a plurality of the same components, and vice versa, unless explicitly stated otherwise. Moreover, applicants do not intend to for any term in the specification or claims to be ascribed an uncommon or special meaning unless explicitly set forth as such. Further, embodiments may encompass present and future known equivalents to the components referred to by way of illustration.

An approach is described for implementing a flexible parser for a networking system. According to some embodiments, a micro-core parser is implemented to process packets in a networking system. The micro-cores of the parser read the packet headers, and perform any suitably programmed tasks upon those packets and packet headers. One or more caches may be associated with the micro-cores to hold the packet headers.

Figure 1:
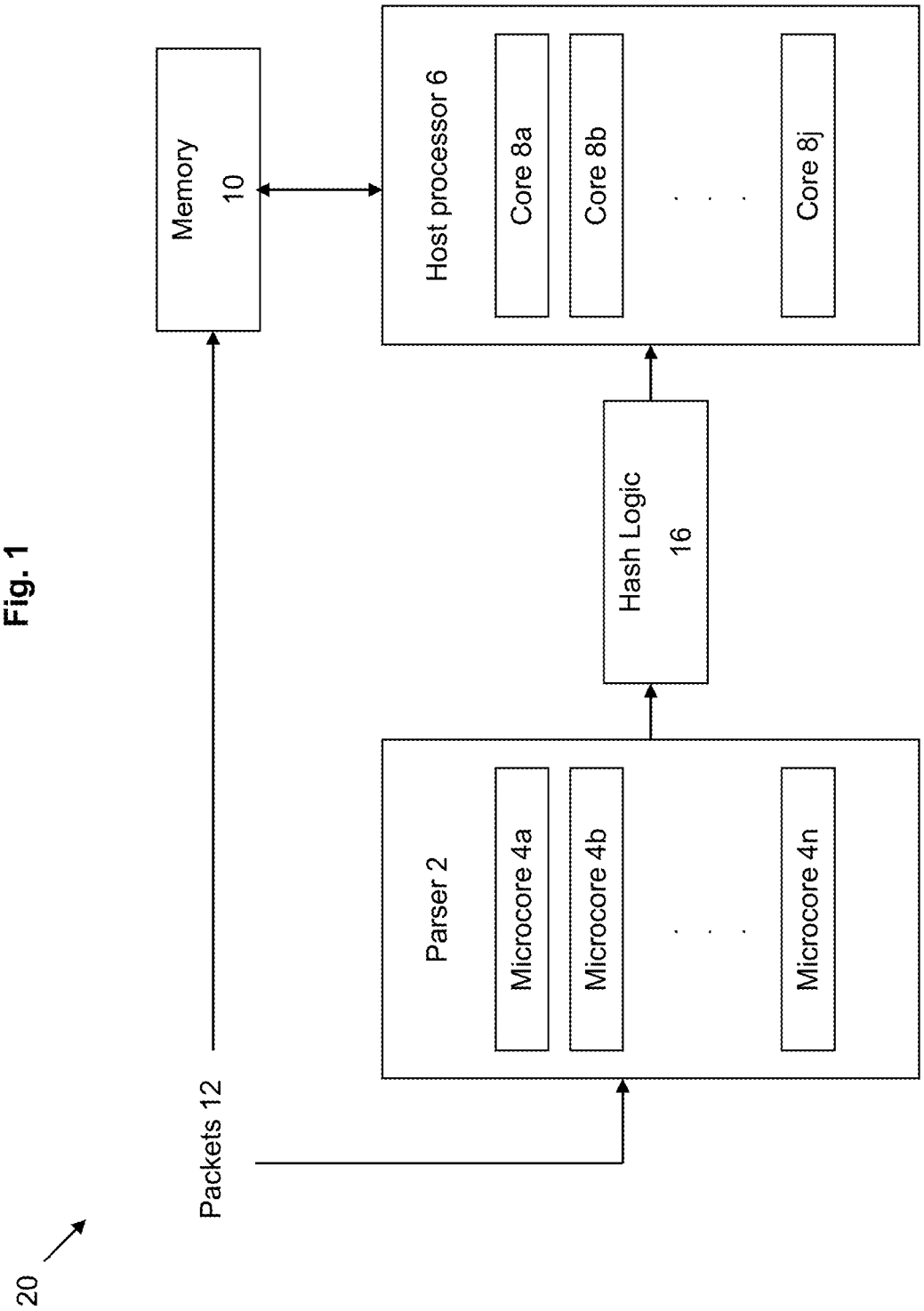
FIG. 1 shows a system for processing packets using a parser that is implemented with one or more micro-cores in accordance with some embodiments.

FIG. 1 shows a system 20 for processing packets 12 using a parser 2 that is implemented with one or more micro-cores 4a-n (also referred to herein as "μcores") in accordance with one embodiment. The parser may be used in conjunction with any processing system, such as a multi-core host processor 6. A multi-core processor is an integrated circuit that contains multiple microprocessor cores, which effectively multiplies the performance of the circuit in correspondence to the number of cores 8a-j. Therefore, the cores 8a-j shown in FIG. 1 correspond to conventionally understood microprocessor cores that are used to implement a multi-core processor. These cores 8a-j are distinguishable from the micro-cores 4a-n in the parser 2, which have a smaller layout footprint as compared to conventional processor cores that are included as processing blocks within a larger integrated circuit. The micro-cores may include elements similar to standard processors cores (such as an instruction RAM and data RAM), but are small enough to allow placement as needed within specialized processing engines/accelerators on a processing system, and which can work in conjunction with the main host processors and processor cores. A micro-core is a small microprocessor, with, for example, a standard single issue pipe-line (e.g., a single issue, 5-stage pipe-line). In some embodiments, a micro-core only has access to local resources, so that the execution latency is deterministic. In some embodiments, the instruction RAM, data/stack RAM, and packet RAM are all local to a micro-core, and there is no access to off-chip resources or other accelerators that can make per-packet execution latency unpredictable.

The parser 2 is operable to parse the plurality of packets 12 to gather packet information. Each of the micro-cores 4a-n within parser 2 may be implemented as a programmable state machine capable of parsing packets from one or more networks and of one or more protocol types. One or more instruction caches are used to hold programming logic for the micro-cores 4a-n, to provide the parsing functionality of the micro-cores 4a-n.

The parser 2 may be instructed to perform any suitable processing function upon the packets 12. For example, the micro-cores 4a-n in the parser 2 may parse packet header information for the packet 12 to provide inputs for hash logic 16. Hash logic 16 is operable to perform a hash algorithm utilizing a key to generate a hash. The packets 12 are allocated for subsequent processing based at least in part on the key/hash generated by the parser 2 and hash logic 16. For example, the packets 12 may be allocated for processing to a specific core 8a-j within a multi-core processing system 6, and/or to a specific thread within one of the cores 8a-j. Some reasons for allocating the packets 12 to different cores 8a-j or to different threads within the cores 8a-j include, for example, to implement load-balancing and/or flow-binding. Load balancing refers to balancing a processing load equally or nearly equally among a group of cores/threads. Flow-binding refers to directing a flow of processing to specific threads or processor cores.

The allocation of the packets to the different cores 8a-j is performed by utilizing the key generated by the hash logic 16, where the key refers to any suitably unique identifier. In one embodiment, the key may be formed by performing multiple field extractions from at least one of the packets. In another embodiment, the key may be formed using the packet information. Any suitable hash algorithm may be utilized to generate the hash. For example, in one embodiment, the hash logic 16 may include a cyclic redundancy check (CRC) algorithm. As an option, the hashing logic 16 may include a CRC algorithm with a programmable polynomial.

The system 20 may further include memory 10 to which the packets 12 are written. In some embodiments, the packets 12 are parsed before the packets 12 are written to the memory 10. In addition, the hash logic 16 may also be performed before the packets 12 are written to the memory 10. Additionally, the packets 12 may be allocated to the cores 8a-j before the packets 12 are written to the memory 10. In another embodiment, the packets 12 may be written to the memory 10 simultaneously or nearly simultaneously with the parsing, hashing, and/or allocation.

In operation, the packets 12 may be transferred to the parser 2 and written to the memory 10. While packets are being received and transferred to the memory 10, the parser 2 may examine the arriving packet data and extract certain data (e.g. user-definable fields, keys, and/or identifiers) from the packet header. The parser 2 may then concatenate these fields together to form a key (e.g. a 128-bit key, etc.) used by a packet director to classify and dispatch the packet. The key may be dispatched to a messaging network (e.g., messaging network 1E02, FIG. 9B) for use in allocating the packets. In addition, the key may be padded in front of the packet, and a descriptor (containing the start address) of the packet may be dispatched to a thread using the messaging network. In this case, the descriptor may be allocated to processor threads or a plurality of processing cores for executing the threads. Using the descriptor, the packet data may be retrieved from the memory 10, where the packet may be stored in the memory 10 (e.g. a cache) and a location of the packet is passed through the messaging network in the key, as opposed to passing all of the packet data through the messaging network. The key may be provided to one or more threads or processing cores utilizing a work queue, e.g. a first in, first out (FIFO) queue.

Each of the micro-cores 4a-n can be instructed to perform one or more packet processing tasks, e.g., by reading in instructions from an instruction cache that is associated with the micro-cores 4a-n. This permits the parser 2 to be flexible enough to operate upon any packet format or to perform any instructable task, simply by changing or updating the instructions that are sent to the parser 2. For example, the packets may include packets of different and multiple protocol types. The parser 2 may extract multiple fields (e.g., for multiple protocols) and identify multiple layer headers (e.g. layer headers in a multi-layer network protocol design). Furthermore, the parser 2 may support TCP/UDP and IP checksum verification.

Figure 2:
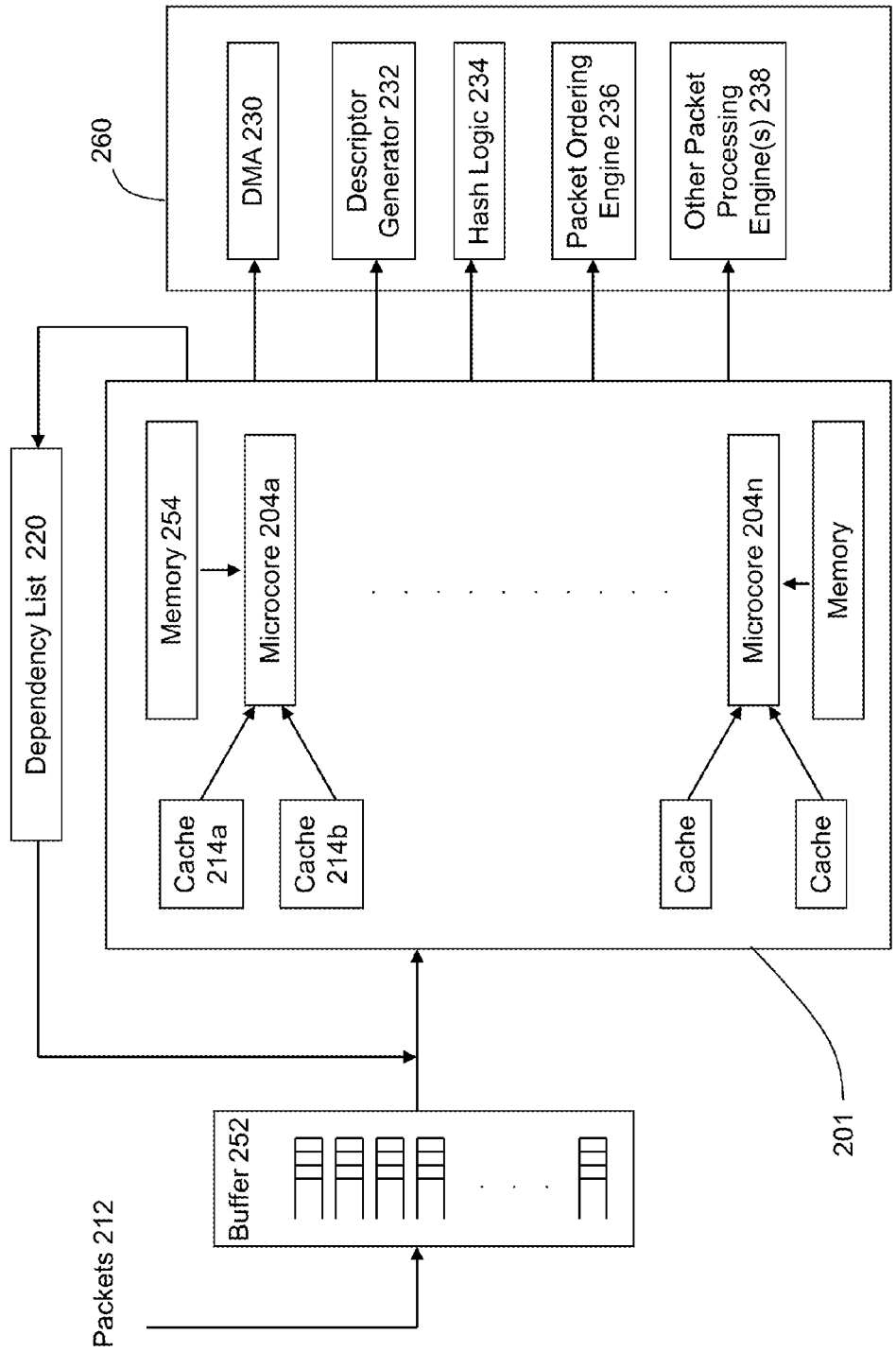
FIG. 2 illustrates a more detailed architectural diagram of a parser that utilizes micro-cores in accordance with some embodiments.

FIG. 2 illustrates a more detailed architectural diagram of a parser 201 that utilizes micro-cores. There may be any number of micro-cores 204a-n in the parser 201. For example, a parser in some embodiments may implement sixteen separate micro-cores 204a-n. Packets 212 are received into a buffer 252, where the buffer 252 includes a bank of FIFOs that forms an input queue of packets waiting to be processed by the parser 201.

The incoming packets 212 that have been received within the buffer 252 are scheduled/assigned to respective micro-cores 204a-n. Any suitable scheduling algorithm may be employed to assign packets in the queue to the micro-cores 204a-n. For example, a round-robin scheduling algorithm may be employed to assign packets 212 to micro-cores 204a-n as they become available. In addition, as described in more detail below, it is possible to schedule packets to specific ones of the micro-cores, e.g., because certain micro-cores are specifically programmed to handle certain tasks, protocols, or packet types differently from the other micro-cores.

Each micro-core 204a is associated with one or more caches 214a and 214b. In some embodiments, the cache 214a/b is limited to a sufficient size to store the header of an incoming packet 212. As such, the entirety of a packet 212 is not sent to the micro-core 204a. Instead, only the first n bytes of the packet 212 (e.g., the bytes forming the header) are directed to the micro-core 204a. In some embodiments, the cache 214a/b is sized at 512 bytes, so that the first 512 bytes of a packet 212 would be loaded into the cache 214 a/b.

Multiple caches 214a and 214b may be associated with a single micro-core 204a, to allow that micro-core 204a to operate at or near its full capacity with minimal downtime. During the time that the micro-core 204a is operating upon a packet in a first cache 214a, the second cache 214b can be filled in with a new packet or emptied of a completed packet. As soon as the micro-core 204a has finished processing the packet in the first cache 214a, that micro-core 204a can immediately begin processing the packet that had been concurrently loaded into the second cache 214b. The first cache 214a can then repeat the cycle of emptying the completed packet and loading a new packet. Each of the caches 214a and 214b can be sized to the maximum threshold memory size to store the packet header.

In some embodiments, each micro-core 204a is associated with a instruction cache/memory 254. The instruction cache/memory 254 stores the operational programming that the micro-core 204a performs to process the packet headers. The programming in the instruction cache/memory 254 may be used to perform any suitable task by the micro-core 204a upon a packet. For example, the micro-core 204a can operate to perform classification operations on the packets. In addition, the micro-core 204a can operate to drop packets and ensure that the packets are not forwarded to subsequent engines or processing cores.

The output from the micro-core 204a is sent to any downstream component 260 that consumes the output from the parser 201. For example, the packet header (when suitably combined with the packet data) can be sent to a DMA 230 for storage and later access. The micro-core 204a can also output information to assist a descriptor generator 232 in generating a descriptor for the packet. For example, the micro-core 204a can be used to forward identification of free FIFOs to the descriptor generator 232. The micro-core 204a may be used to generate a key that is used by hash logic 234 to generate a hash value. The information generated by the micro-core 204a may also be directed to a packet ordering engine 236 to assist in ordering the packets to be processed by the networking system. Generally, the micro-core 204a may provide data used by other packet processing engines and mechanisms 238 within the networking system.

A dependency list 220 is employed to make sure packets 212 are processed and released by the micro-cores 204a-n in their proper order. This dependency list is used to make sure that a later packet within a given flow is not released unless an earlier packet has already been processed and released.

Figure 3:
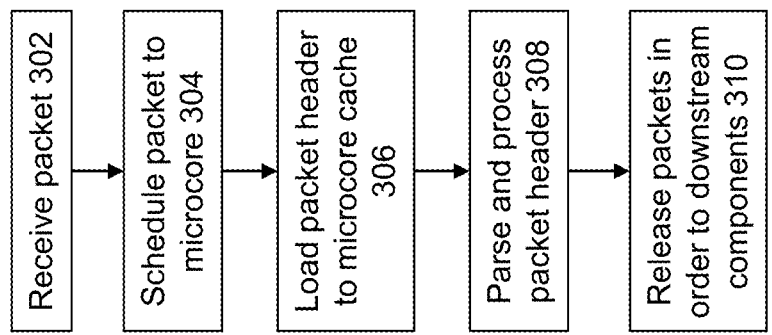
FIG. 3 shows a flowchart of an approach for utilizing one or more micro-cores in a parser in accordance with some embodiments.

FIG. 3 shows a flowchart of an approach for utilizing a micro-core based parser (e.g., parser 201, FIG. 2) to process packets in a networking system. At 302, a packet is received in the networking system for processing. The packet may be received over one or more physical interface connections and/or data channels. The packet may also be stored and/or queued in various interface and receiving buffers (e.g., buffer 252) when it has been received for processing.

At 304, the packet is scheduled to a selected micro-core for processing. Any suitable scheduling algorithm may be employed to schedule the packets. For example, a simple round robin scheduling algorithm may be employed to assign packets to micro-cores. In addition, more complicated queuing and scheduling algorithms may be employed to ensure fair scheduling of the packets. The scheduling activity may also be performed in reliance upon available hardware resources, where scheduling is delayed until sufficient resources are available to handle the processing results from the micro-cores. Packets can also be assigned to individual micro-cores that have been programmed to perform specific tasks. For example, one of the micro-cores may be specially programmed to handle a unique protocol, and every packet compliant with that unique protocol would be assigned to that micro-core.

At 306, the packet header is loaded into the cache (e.g., cache 214a or 214b) for its assigned micro-core. The cache can be automatically populated with new packet headers as it becomes available. One example criteria that may be used to automatically populate the cache is a determination of the number of bytes received, e.g., a number greater than a programmed threshold could be used to control whether the cache is loaded with the packet header. In some embodiments, the maximum value of this threshold is 512 bytes. Another example criteria that can be considered is whether there are sufficient hardware resources to process the packet. For example, a determination can be made whether there are sufficient free descriptors that are available for that packet to be able to exit the microcode once the processing is completed.

At 308, the micro-core processes the packet header, e.g., where the micro-core performs one or more ingress functions to process the packet in a networking engine. For example, the micro-core may operate to parse the first n bytes of the packet (e.g., up to the first 512 bytes) to determine the destination of the packet within a host processor or host processor core. If appropriate, the micro-core may also operate to drop the packet, e.g., if the micro-core performances analysis that determines that it is appropriate to drop the packet for lack of a suitable destination. The micro-core may also be operated to modify one or more bits in an ingress descriptor to communicate information derived from the ingress (e.g., an ingress MAC or parsed header) to a downstream component, such as downstream host processor/core.

In addition, the micro-core may add a pre-pad to the packet. For example, consider an example packet format in which a certain portion of the packet is left open, e.g., such that the first 64 bytes of the packet are left open. This open portion of the packet can be occupied by data inserted by the micro-core to communicate parsed information to a downstream component, such as a host processor/core. For example, the 64 bytes pre-pad can be filled in 16, 32, 48 or 64 byte portions before the packet data.

At 310, after processing by the micro-cores, the packets may be released to downstream components (e.g., components 260). A dependency list (e.g., list 220) is used to ensure that the packets are released in an appropriate order.

Figure 4A:
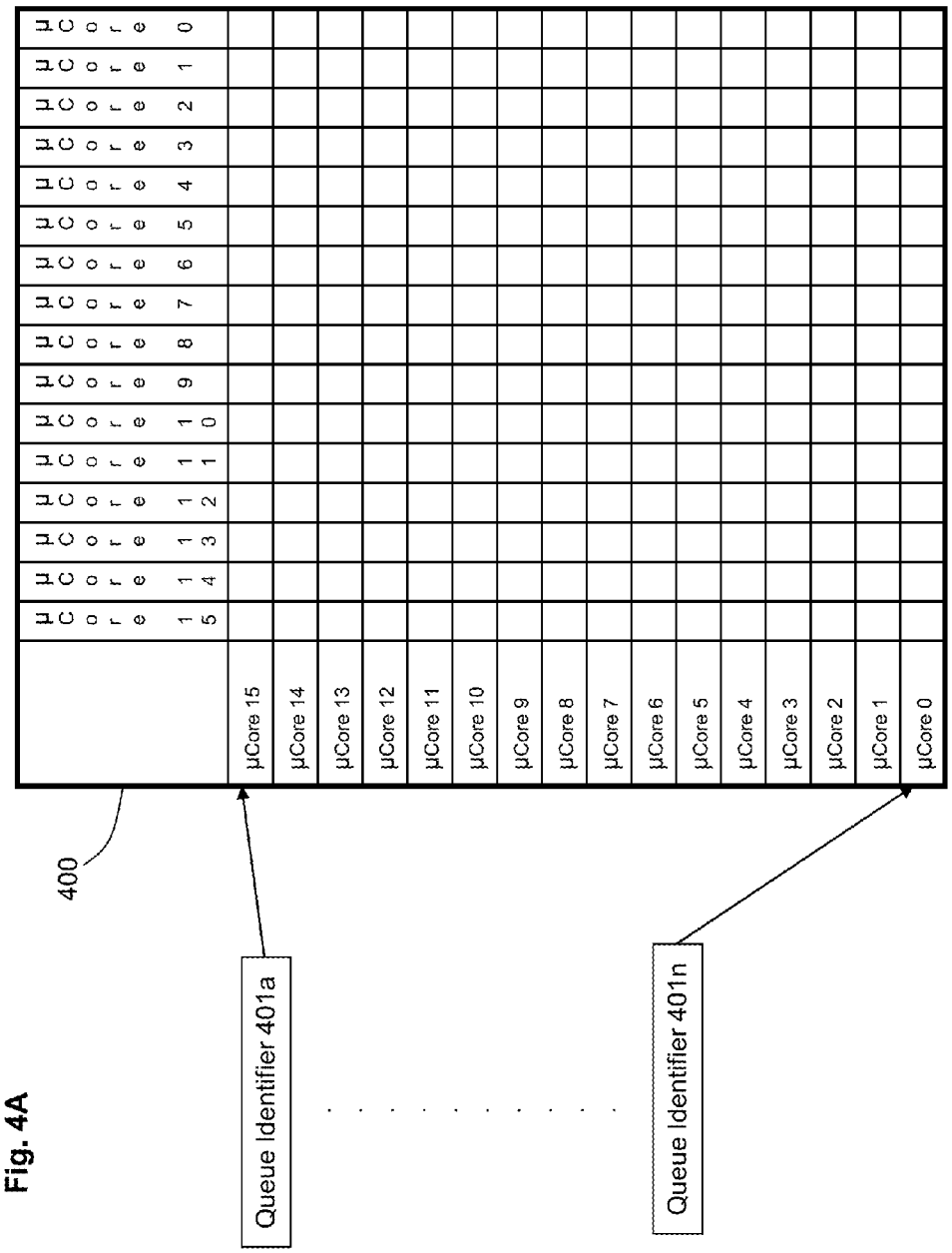
FIG. 4A illustrates an example dependency list structure.

FIG. 4A illustrates an example structure 400 that can be used to implement a dependency list in some embodiments. Structure 400 is implemented as a set of rows and columns, where each row of the structure 400 corresponds to a bit vector that identifies the dependencies of a specific packet in a micro-core. Each bit in a row can be used to identify whether the packet corresponding to that row has a dependency to another packet, e.g., by setting a "1" value in a bit position to indicate a dependency and a "0" value to indicate no dependency. Therefore, a row having all "0" values means that the corresponding packet does not have any dependencies, and can be released upon completion of processing by the micro-core. However, the presence of one or more "1" values for the bit vector in a row means that the corresponding packet has a dependency to at least one other packet, and hence cannot be released until the other packet(s) have been released.

Each column corresponds to the dependencies that other packets have to a given packet. As a packet is added to a row in the structure 400, it will include "1" values in the columns for the earlier packets in the same flow. Subsequent packets in the same flow will have rows that are modified to include a "1" value in the column that corresponds to that earlier packet.

The example structure 400 shown in FIG. 4 is organized for a parser that utilizes sixteen micro-cores (micro-cores 0-15). Therefore, there are sixteen separate rows that correspond to packets which are received for each of the sixteen micro-cores, where each row identifies the dependencies for its associated packet. Similarly, there are sixteen columns that correspond to each of the sixteen micro-cores, where each column identifies any other packets that have a dependency on the packet associated with that column.

Each packet may be associated with queue identifiers 401a-n that identify the packet's positioning in a scheduling queue. When that packet is received/scheduled for processing by a micro-core, the specific queue identifier for that packet is associated with the row in the structure 400.

Any hardware, software, or combination of hardware and software may be employed to implement dependency list structure 400. For example, the dependency list structure 400 may be implemented using a content addressable memory (CAM).

Figure 4B:
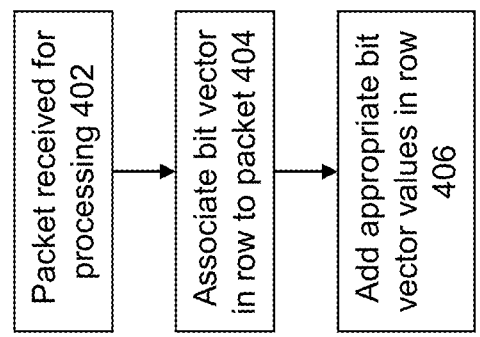
FIG. 4B shows a flowchart of an approach for adding information to a dependency list structure in accordance with some embodiments.

FIG. 4B shows a flowchart of an approach for populating a dependency list structure 400 according to some embodiments. At 402, a packet is received for processing. This action is taken, for example, when the cache associated with a micro-core has been populated with the packet header, and is ready to be parsed by the micro-core for processing.

At 404, the row in the dependency list structure that corresponds to the micro-core is associated with the packet. This occurs, for example, by associating the queue identifier for the packet to the specific bit vector for that micro-core's row in the dependency list structure.

The bit vector in the row is then populated at 406 with bit values that appropriately identify the dependencies for the packet associated with the bit vector. For example, the column position for each earlier packet in the same flow is marked with a "1" value to indicate the dependency and the column position for a packet for which there is no dependency is marked with a "0" value.

Figure 5A:
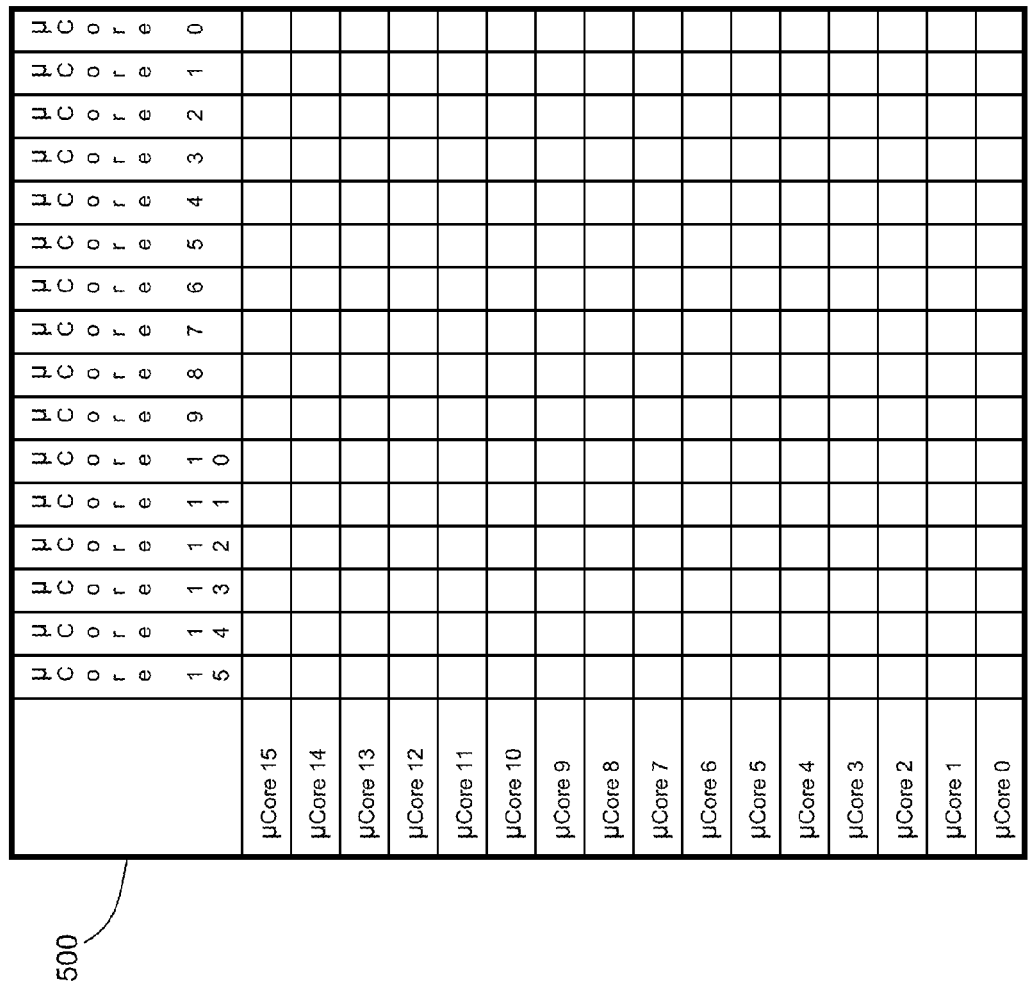

FIGS. 5A-D provide an illustration of this process. FIG. 5A shows a dependency list structure 500 that has not yet been populated with bit vectors associated with any packets. In other words, there are currently no packets being processed by any micro-cores represented by the dependency list structure 500.

Assume that a packet has been received for processing by a given micro-core (e.g., micro-core 0). As shown in FIG. 5B, the row 504 in the dependency list structure 500 associated with micro-core 0 is populated with a bit vector for that packet. In the current situation, each bit position in the bit vector is marked with a "0" value to indicate that there are no current dependencies for this packet, which makes sense since there are no earlier packets in this flow which are currently being processed by another micro-core.

Next, assume that another packet is received in the same flow for processing, but this time by micro-core 7. As shown in FIG. 5C, the row 506 in the dependency list structure 500 associated with micro-core 7 is populated with a bit vector for that packet. Since the packet associated with row 506 is within the same flow as the packet associated with row 504 but is later in time, a dependency is indicated in the bit vector associated with row 506. Column 507 is associated with the micro-core 0 that is handling the earlier packet (i.e., the micro-core 0 handling the earlier packet represented in row 504). Therefore, the bit value in column 507 for row 506 is marked with a "1" value to indicate the dependency. Each other bit position in the bit vector for row 506 is marked with a "0" value to indicate that there are no other current dependencies for this packet.

Figure 5D:
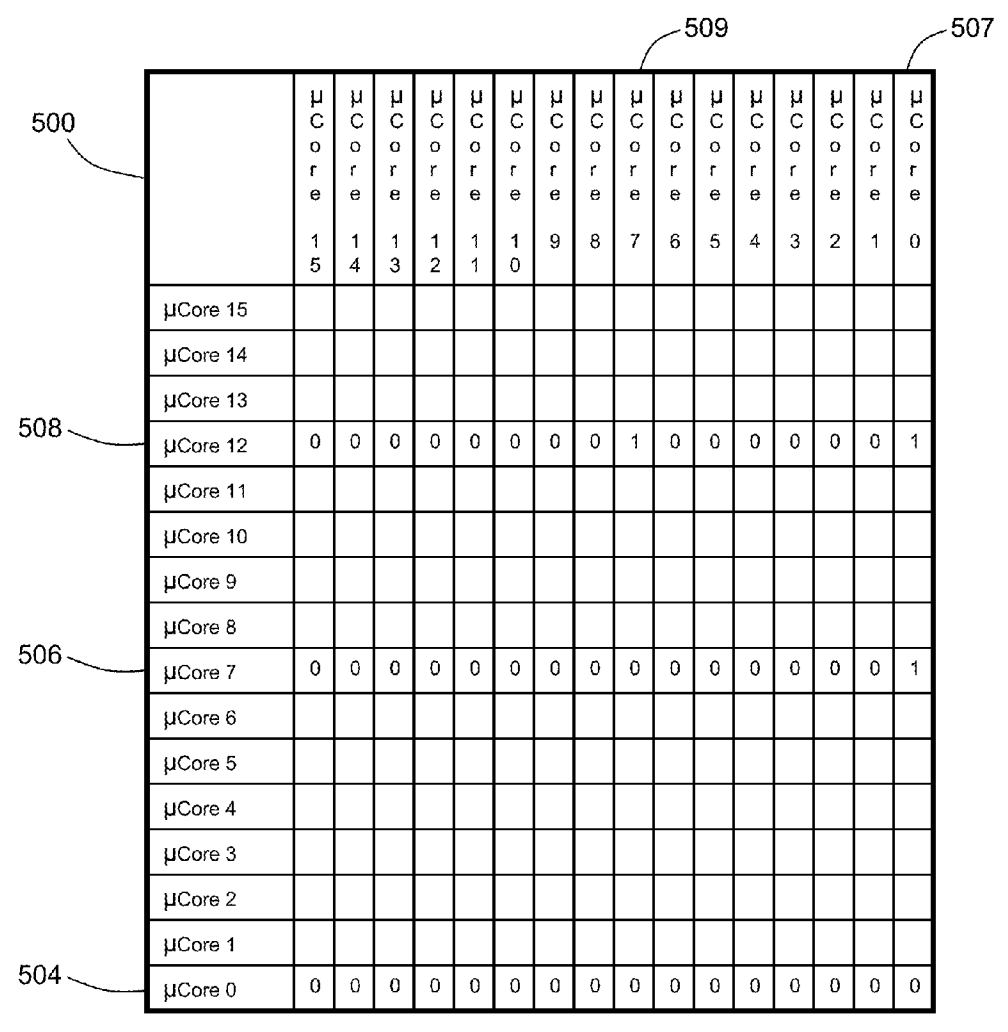

Assume that yet another packet is received in the same flow for processing, this time by micro-core 12. As shown in FIG. 5D, the row 508 in the dependency list structure 500 associated with micro-core 12 is populated with a bit vector for that new packet. Since the packet associated with row 508 is later in the same flow as compared to the packets associated with rows 504 and 506, multiple dependencies need to be indicated in the bit vector associated with row 508. Like the bit vector for the packet associated with row 506, the column 507 associated with the micro-core 0 is modified to include a bit value in this column for row 508 (e.g., a "1" value) to indicate the dependency. Column 509 is associated with the micro-core 7 that is handling the earlier packet (i.e., the micro-core 7 handling the earlier packet represented in row 506). Therefore, the bit value in column 509 for row 508 is marked with a "1" value to indicate the dependency. Each other bit position in the bit vector for row 508 is marked with a "0" value to indicate that there are no other current dependencies for this packet.

When a packet is to be released, the dependency list structure is checked to determine whether that packet is associated with any dependencies that should prevent release of that packet. This is to make sure that a packet later in a flow is not released until any earlier packets in that same flow have already been released.

Figure 6:
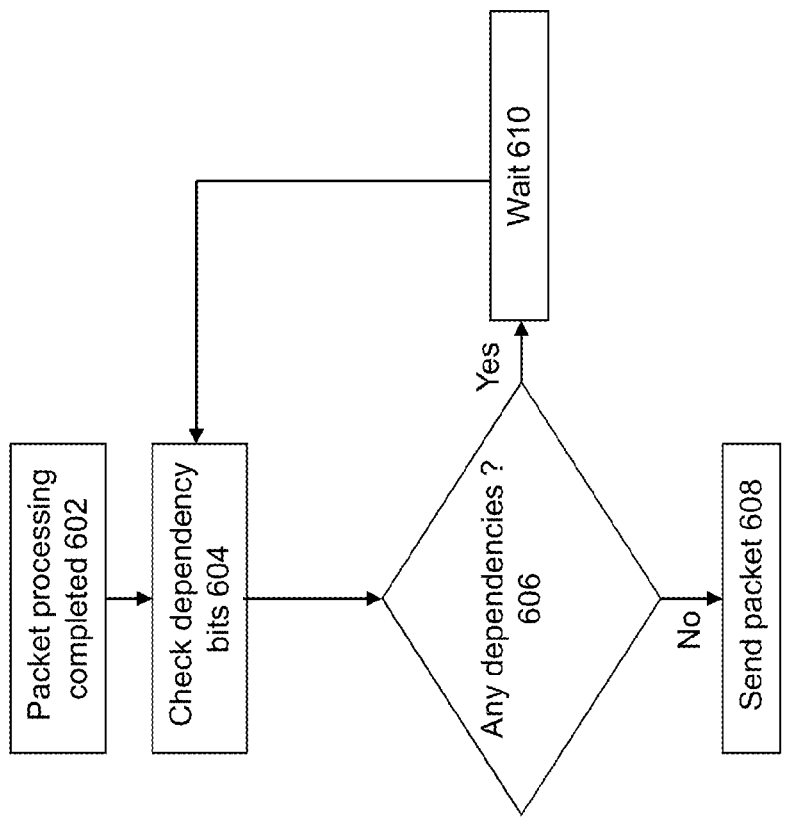
FIG. 6 shows a flowchart of an approach for using a dependency list structure in accordance with some embodiments.

FIG. 6 shows a flowchart of an approach for using a dependency list structure to manage release of packets according to some embodiments. Release of a packet includes release of the portion of packet data provided to the parser. For example, in some embodiments only the packet header is provided to the parser; release of the packet thus includes release of the header from the parser. At 602, a packet is identified for which packet parsing has been completed. This action may be taken, for example, when the micro-core associated with a packet has completed its processing, and provides a signal indicating that it is ready to release the packet to one or more downstream components.

At 604, the bit vector associated with the packet is checked to determine whether there are any dependencies for that packet. This action is taken by reviewing the bit values in the bit vector associated with the packet, and checking whether there are any bit values indicative of a dependency, e.g., by checking whether there are any "1" values for any bits in the bit vector.

The action to be taken at this point depends on whether any dependencies have been identified. From decision box 606, if there are no identified dependencies, then the packet can be immediately released at 608. However, if there are any identified dependencies, then the packet cannot be immediately released. Instead, a wait state 610 occurs to wait for the release of the earlier packet(s). After waiting, the procedure loops back to 604 to re-check the status of any dependencies. If all dependencies have been cleared, then the packet can be released at 608. The loop is repeated if there are still any remaining dependencies.

Figure 7B:
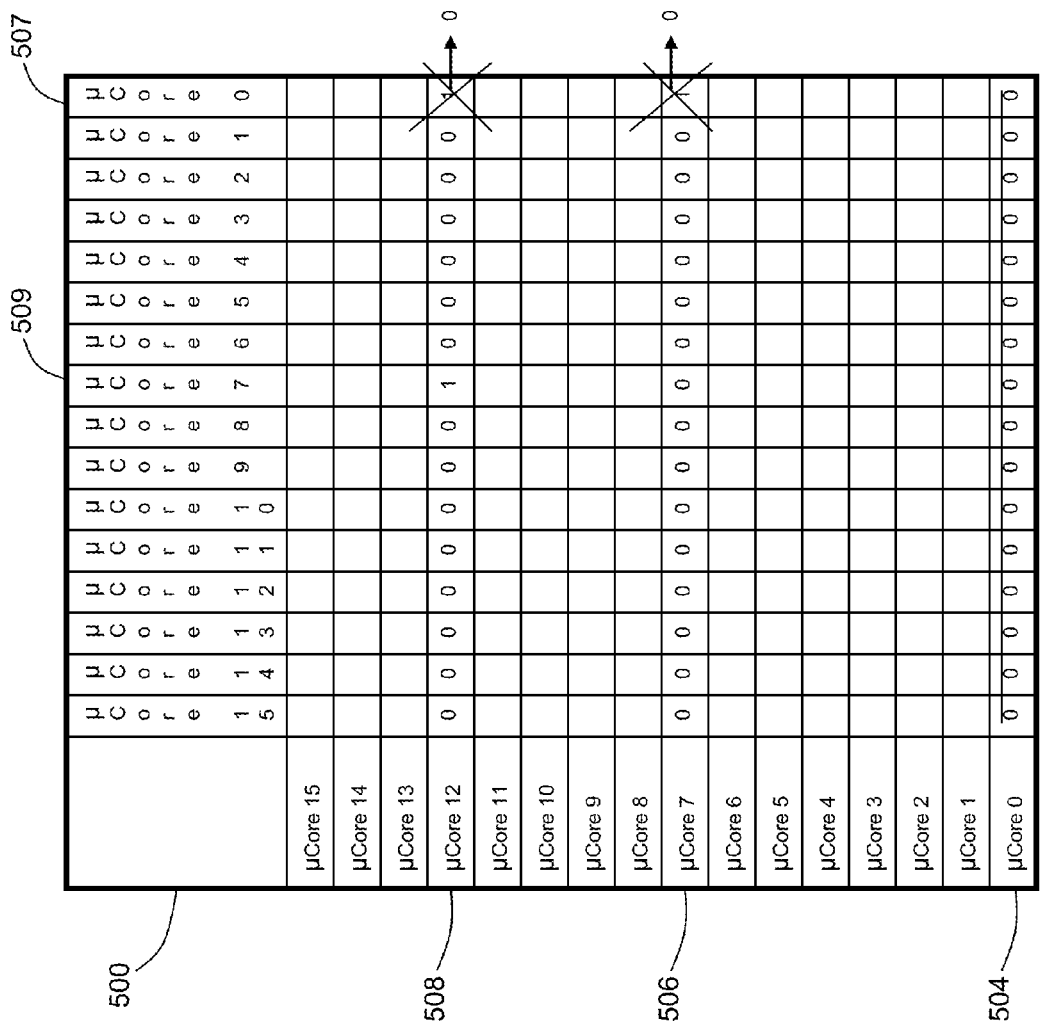

FIGS. 7A-F provide an illustration of this process. FIG. 7A reproduces the dependency list structure 500 from FIG. 5D, which has already been populated with bit vectors associated with packets. Recall from the earlier discussion that the first packet in the flow is being handled by micro-core 0, and hence is represented by the bit vector associated with row 504. The second packet in the same flow is being handled by micro-core 7, and hence is represented by the bit vector associated with row 506. The bit vector associated with row 506 includes a bit value in column 507 indicative of a dependency on the packet being handled by micro-core 0. The third packet in the same flow is being handled by micro-core 12, and hence is represented by the bit vector associated with row 508. The bit vector associated with row 508 includes a bit value in column 507 indicative of a dependency on the packet being handled by micro-core 0, and also includes a bit value in column 509 indicative of a dependency on the packet being handled by micro-core 7.

At the current moment in time, the packets associated with micro-cores 7 and 12, represented by rows 506 and 508, respectively, cannot be released since the bit vectors for each of these packets indicates at least one dependency, e.g., because there is at least one "1" values for a bit in each of these bit vectors. However, the bit vector represented in row 504 for the packet being handled by micro-core 0 does not show any dependencies, e.g., because every bit position shows a value of "0" in the bit vector.

Assume that micro-core 0 has completed the required processing for its packet represented by row 504, and therefore is to release this packet. The bit vector in row 504 for this micro-core 0 is checked to see if there are any dependencies.

Since there are no dependencies indicated by the bit vector (e.g., because all bit values are "0"), the packet can be immediately released. As shown in FIG. 7B, the bit vector in row 504 associated with this packet/micro-core is cleared, and the micro-core 0 can now be assigned to process another packet. In addition, any dependencies by other packets upon this packet can also be cleared. This is accomplished by setting the bit values in the column associated with the micro-core to indicate release of the packet. Here, column 507 is associated with micro-core 0. Therefore, the values that had previously been set in this column to indicate dependencies can now be changed to indicate release of the dependency, e.g., by changing bit value "1" in column 507 for rows 506 and 508 to a bit value of "0".

Figure 7C:
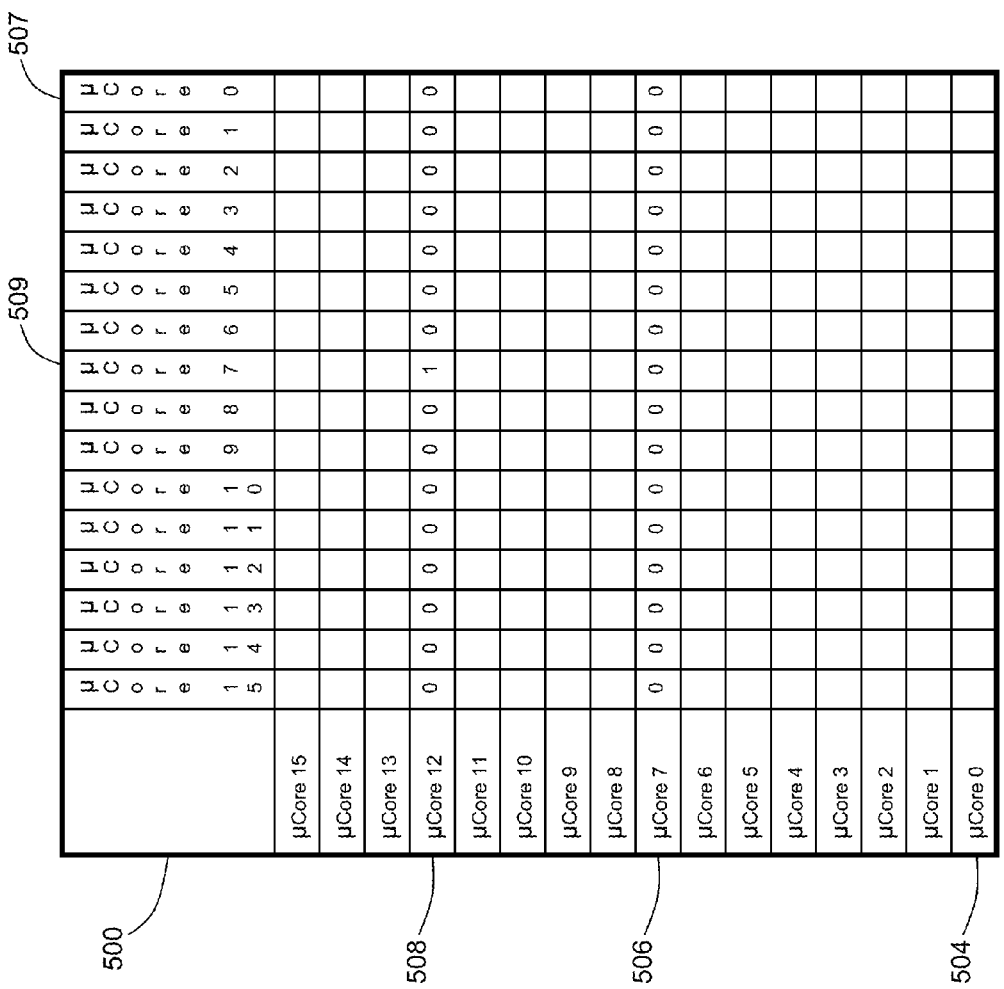

FIG. 7C shows the current state of the dependency list structure 500 after these changes to the bit vectors. At the current moment in time, the packet associated with micro-core 12 represented by row 508 cannot be released since the bit vectors for this packet indicates at least one dependency, e.g., because there is at least one "1" values for a bit in this bit vectors. However, the bit vector represented in row 506 for the packet being handled by micro-core 7 does not show any dependencies, e.g., because every bit position shows a value of "0" in the bit vector.

Figure 7D:
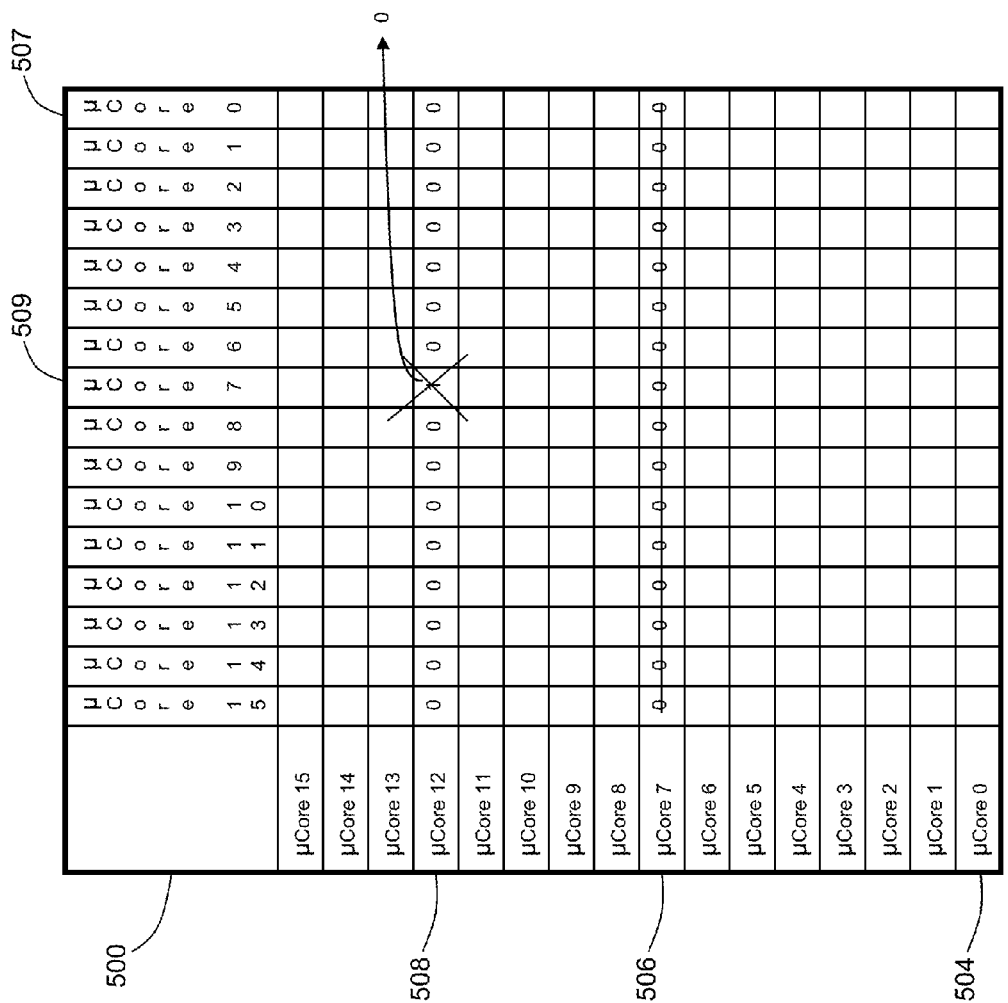

Assume that an instruction is received to release the packet being handled by micro-core 7. The bit vector in row 506 for micro-core 7 is checked to see if there are any dependencies. Since there are no dependencies indicated by the bit vector (e.g., because all bit values are "0"), the packet can be immediately released. As shown in FIG. 7D, the bit vector in row 506 associated with this packet is cleared, and the micro-core 7 can now be assigned to process another packet. In addition, any dependencies by other packets upon this packet can also be cleared. This is accomplished by setting the bit values in the column associated with the micro-core to indicate release of the packet. Here, column 509 is associated with micro-core 7. Therefore, the values that had previously been set in this column to indicate dependencies can now be changed to indicate release of the dependency, e.g., by changing bit value "1" in column 509 for row 508 to a bit value of "0".

Figure 7E:
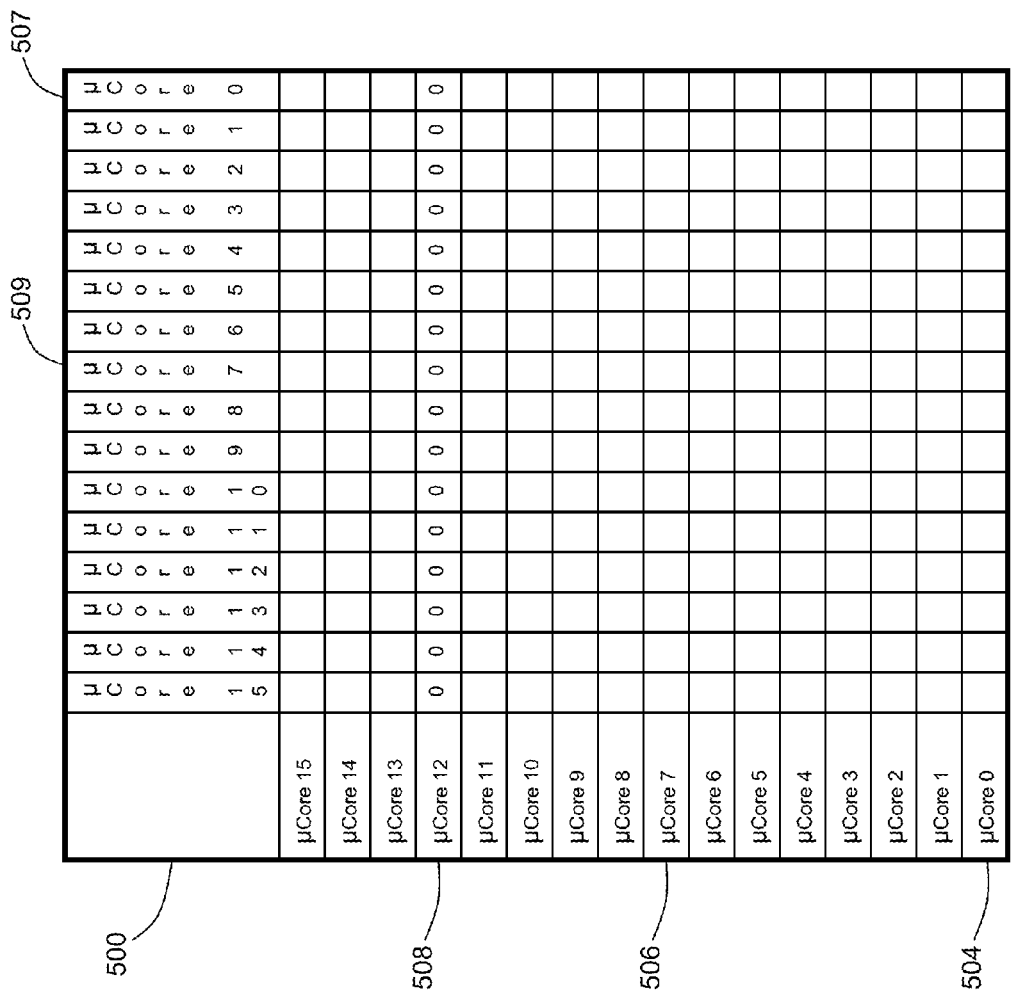

FIG. 7E shows the current state of the dependency list structure 500 after these changes to the bit vectors. At the current moment in time, the packet associated with micro-core 12 represented by row 508 can be released since the bit vectors for this packet indicates that there are no dependencies for this packet, e.g., because every bit position shows a value of "0" in the bit vector.

Figure 7F:
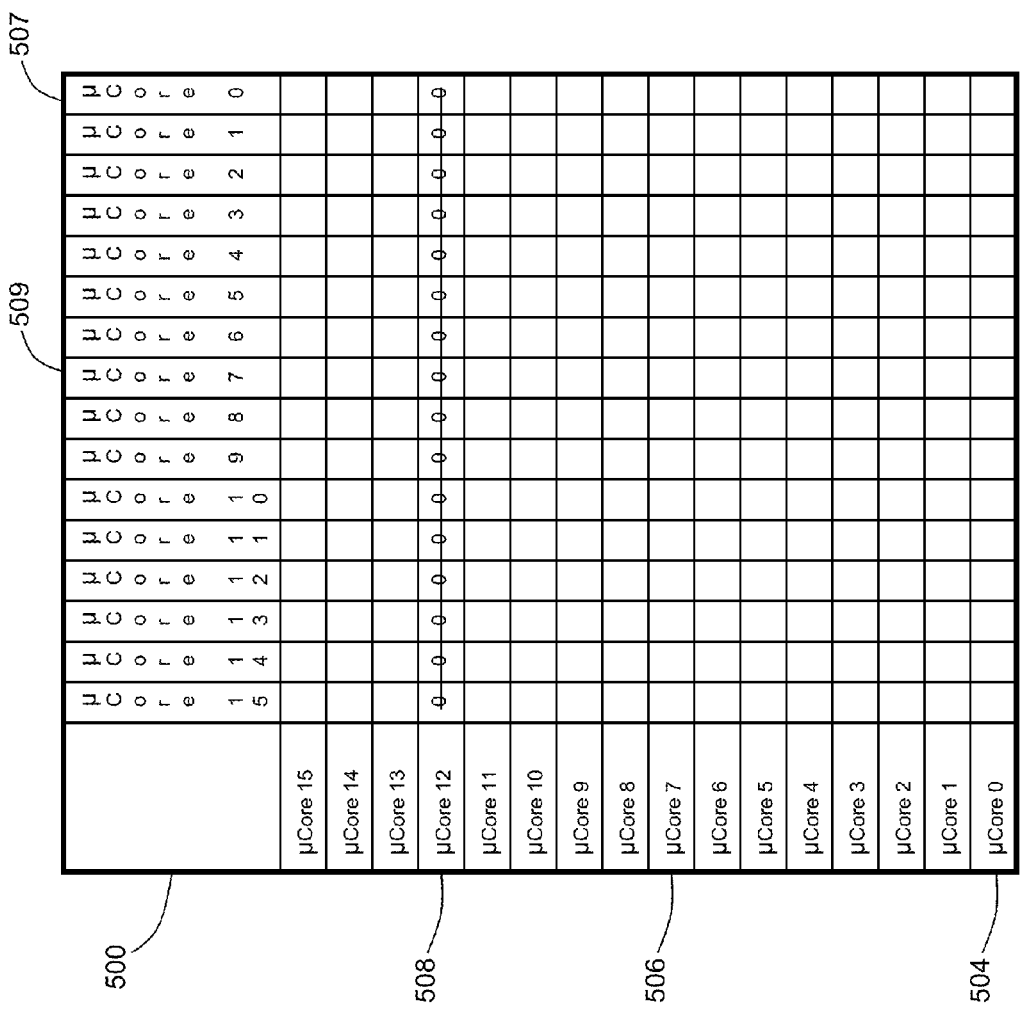
Figure 7G:
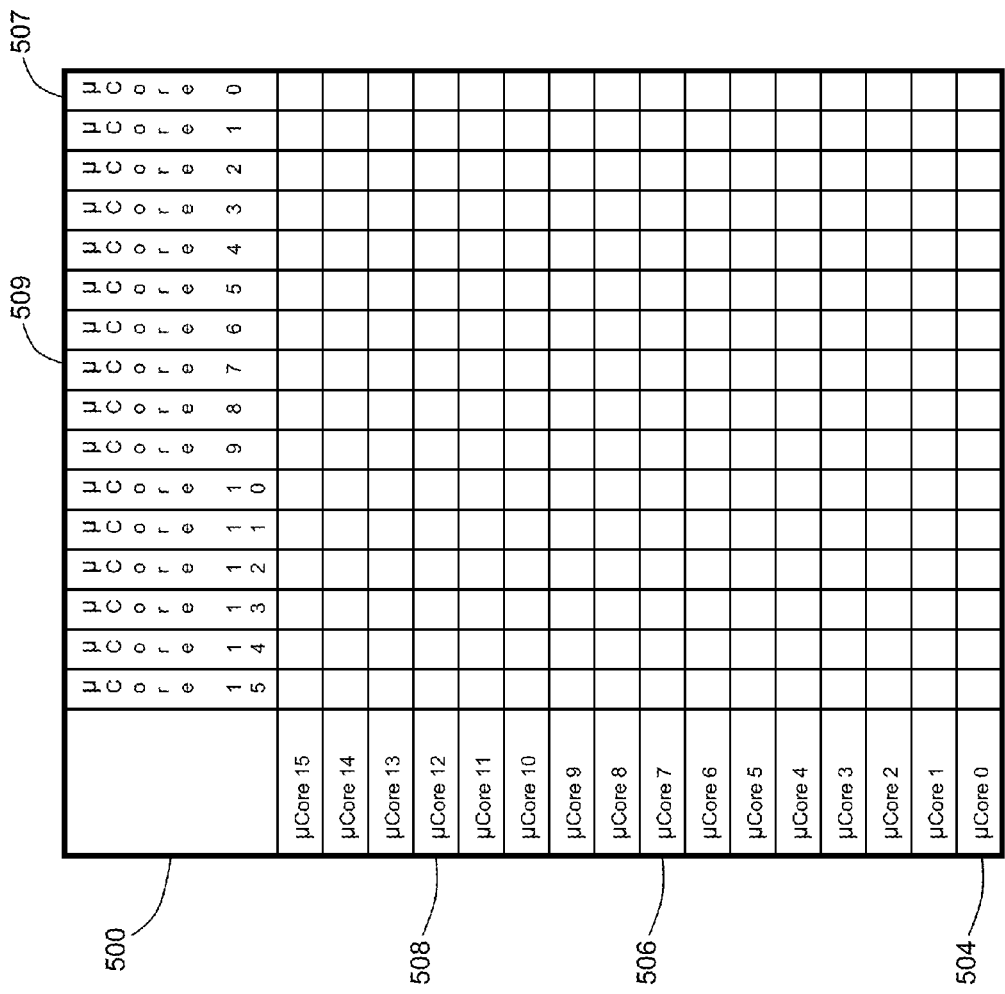

Assume that an instruction is received to release the packet being handled by micro-core 12. The bit vector in row 508 for micro-core 12 is checked to see if there are any dependencies. Since there are no dependencies indicated by the bit vector (e.g., because all bit values are "0"), the packet can be immediately released. As shown in FIG. 7F, the bit vector in row 508 associated with this packet is cleared, and the micro-core 12 can now be assigned to process another packet. In addition, any dependencies by other packets upon this packet can also be cleared. Here, there are no dependencies by other packets upon this packet, therefore, no bits are reset at this time. FIG. 7G now shows the current state of the dependency list structure 500 after this change to the bit vectors.

When assigning packets to micro-cores, packets can be scheduled to specific ones of the micro-cores. FIG. 8 shows a flowchart of an approach for directing packets to specific micro-cores according to some embodiments. At 802, a packet is received for scheduling. For example, the packet may have been received into a receive buffer 252 (FIG. 2) having a set of FIFOs, where the packet is placed into one or more of the FIFOs.

When the packet is received for scheduling, then at 804 that packet can be checked to see if it should be assigned to a specific micro-core (e.g., a specific one of micro-cores 204a-204n). For example, certain micro-cores may be specifically programmed to handle certain tasks, protocols, or packet types differently from the other micro-cores. The packet can be analyzed to determine whether it pertains to one of the specially programmed micro-cores.

One approach that can be taken to implement this action is to use an interface mask to spray the incoming packets to different ones/sets of micro-cores based on the specific interface through which the incoming packet was received. The mask bits differentiate the packets between the different interfaces, so that certain packets from certain interfaces are directed to corresponding micro-cores. The parsing function can be different for the different micro-cores, e.g., because of different contents of the instruction RAMs for different interfaces for the different micro-cores.

At 806, the packet is thereafter scheduled for the identified micro-core. When the cache for the micro-core is available, the packet header for the packet is loaded into that cache for parsing/processing by the micro-core.

Embodiments may be utilized in any suitable network processing system or subsystem. For example, the micro-core-based parser can be used in a network acceleration engine (NAE) of a network processor.

FIG. 9A is a diagram illustrating an exemplary system 900 that employs a micro-core-based parser, in accordance with at least one embodiment of the present disclosure. In particular, this figure shows a network acceleration engine (NAE) 910, which includes a packet ingress subsystem 930 that performs parsing and classification of incoming packets that are received from the ingress ports 946 of the network interface 904. In some embodiments, the packet ingress subsystem 930 performs its parsing and classification functions using a dedicated hardware parser and a number of programmable micro-core processors, e.g., sixteen micro-core processors.

The NAE 910 provides packets to a packet ordering engine (POE) 920 that is responsible for ensuring that data packet fragments belonging to a specific flow are transmitted by the packet egress subsystem 940 in the same order in which they were received by the packet ingress subsystem 930. The packet egress subsystem 940 transmits packets outward through the egress ports 948 in the network interface 904. The packet data path to communicate packets in system 900 includes an I/O distributed interconnect 942. The message data path to communicate messages in system 900 includes a messaging network 933.

System 900 employs free descriptor queues that are divided into any number (e.g., twenty) descriptor pools. Descriptors are message units of specially formatted words (e.g., 64-bit formatted words). For the NAE 910, each descriptor points to a pre-allocated data buffer in memory where packet data will be stored. Free-in messages are used to initialize the descriptors in the pools. The micro-core processors in the NAE Packet Ingress Subsystem 930 are used to determine which descriptor pool to draw descriptors from for each data packet, which thereby determines where each data packet will be written in memory.

Figure 9B:
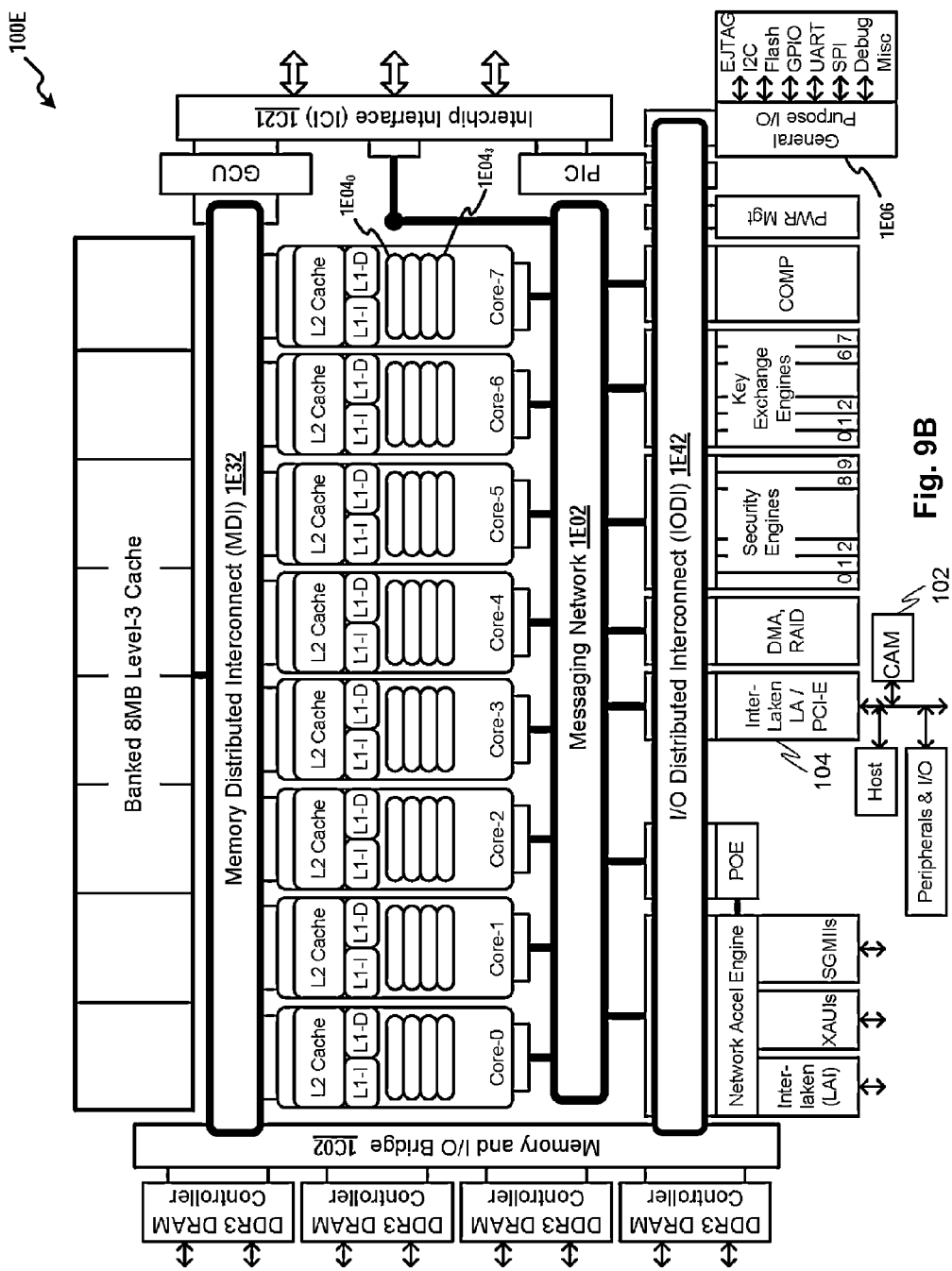

FIG. 9B depicts an example processing system 100E that may utilize the network acceleration engine 900 of FIG. 9A. The processing system 100E has three bidirectional communication rings (each depicted as a bold-line oval), a plurality of CPUs (e.g. Core-0, Core-1, etc), a plurality of accelerators (e.g. Network Acceleration Engine, POE, Interlaken-LAI) to perform a set of operations, and a plurality of IO blocks (e.g. ICI, general purpose I/O 1E06, etc). The three rings can be used for referring to and/or moving packets within the context of an on-chip network.

As shown, each instance of the plurality of CPUs (e.g. Core-0, Core-1, etc) comprises its respective level two cache (e.g. the respective L2 cache, as shown), and comprises its respective level one cache for instructions (e.g. the respective L1-I cache) and its respective level one cache for data (e.g. the respective L1-D cache). Each of the CPUs has a virtual CPU (e.g. $1E04_0, \ldots 1E04_3$) depicted as an oval within a core. These CPUs are separate from the micro-cores in the parser in the Network Acceleration Engine.

In some embodiments, the Memory Distributed Interconnect 1E32 (MDI) comprises a memory interconnect ring, the messaging network 1E02 comprises a messaging ring, and the I/O distributed interconnect 1E42 (IODI) comprises an IO interconnect ring. Also shown is a packet ordering engine (POE) to distribute packets in a particular order to a networking output. In this embodiment, the POE connects to the network acceleration engine (shown as, Network Accel Engine).

In the embodiment shown, the processing system 100E includes an L3 cache to connect to the MDI ring 1E32. The interconnect serves to connect memory elements to other memory elements, possibly using a message station or direct memory access logic. For example, in some embodiments, an instance of a CPU (e.g. Core-0) includes one or more cache memories local to the CPU, and the local cache can be connected to the Memory Distributed Interconnect 1E32 ring. A memory interconnect ring 1E32 can be configured to any width, including any width of any interconnected memory, or even multiples of widths of any interconnected memory, or even fractions of the width of any interconnected memory.

The processing system 100E depicts an I/O distributed interconnect 1E42, which I/O distributed interconnect 1E42 serves to connect IO blocks (e.g. PCI-E, POE, etc) and accelerators (e.g. network acceleration engine, security engines) to each other, and to the messaging network 1E02 (as shown).

The accelerators can be located and configured to perform any specific operation. In some cases, one or more accelerators can be configured to perform such a specific operation autonomously (e.g. without intra-operation intervention by a CPU) and, in some cases, one or more accelerators can be configured to perform operations under programmatic control, which programmatic control can be implemented in any combination of configuration registers and sequencing units (e.g. a finite state machine, a micro-sequencer, etc). The Interlaken LA/PCI-E (104) may be a single module or two separate modules. The Interlaken LA of 104 may be individually enabled or disabled while the PCI-E is always enabled in some embodiments. The Interlaken LA/PCI-E (104) interacts with a number of devices that are outside the boundary of the processing system 100E, and the number of devices may include, for example, a knowledge-based processor or any look-aside devices 102 (identified as a content-addressable memory or CAM), a host, and peripherals and I/O.

Further details regarding an exemplary processing system that may be used to implement the system of FIG. 9B is described in U.S. patent application Ser. No. 13/107,809 filed May 13, 2011, entitled "IMPLEMENTING INTEGRATED NETWORKING FUNCTIONS AT WIRE SPEED", which is hereby expressly incorporated by reference in its entirety.

Figure 10:
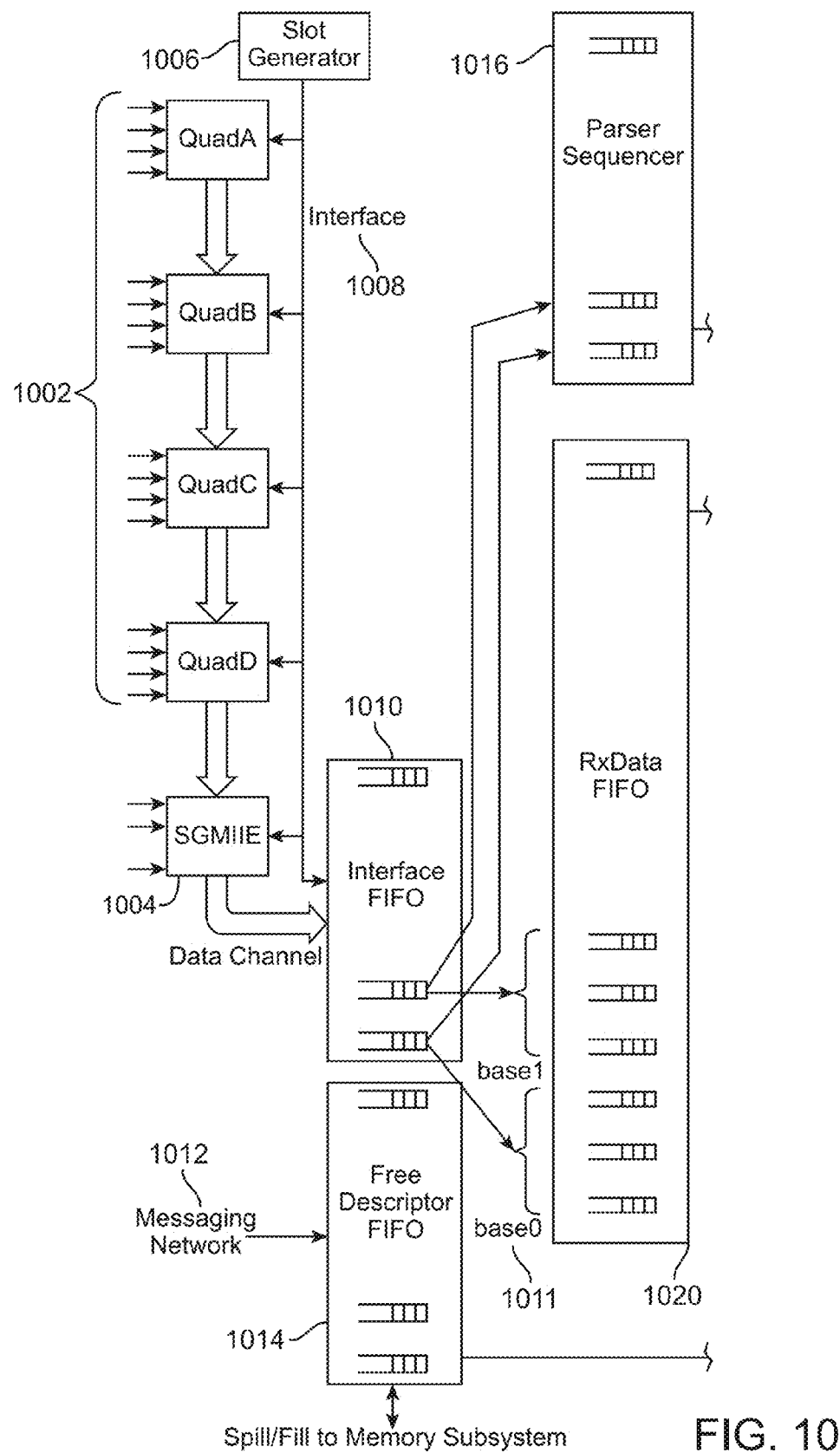
FIG. 10 illustrates an example ingress path subsystem in which a micro-core based parser may be employed.
Figure 10:
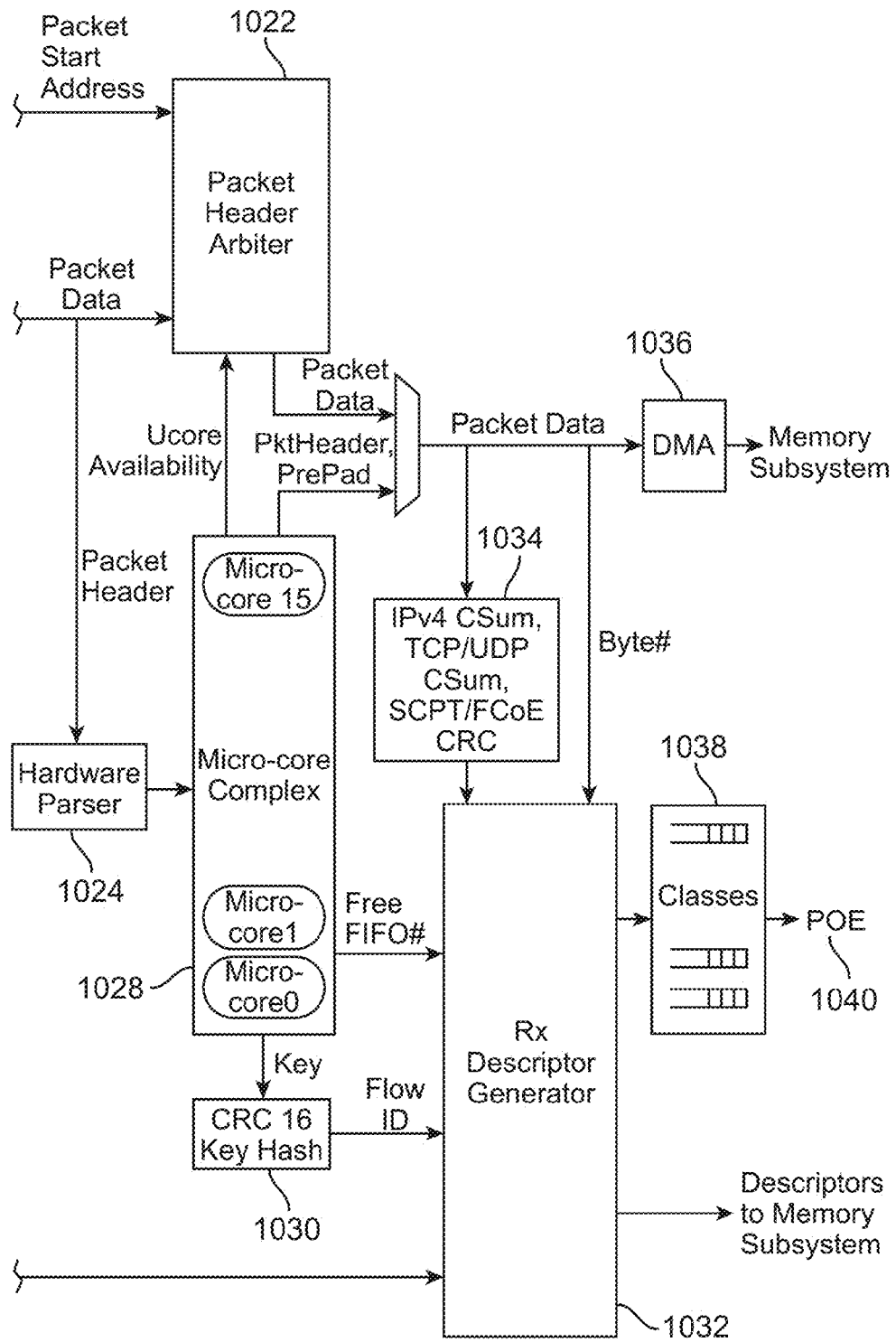

FIG. 10 depicts a block diagram of an ingress path subsystem for a NAE according to some embodiments. The main function of the ingress path subsystem in this example is to receive packets from the network interface and store those packets, via the DMA 1036, into pre-allocated buffers in a memory subsystem.

The packet data is received through one or more interfaces 1008 (e.g., through the four Quads 1002). Quads 1002 may be implemented as Serdes lines, where the Quads 1002 take care of the networking interface protocols for receiving the incoming packets over the network interface 1008. The incoming packets are placed into interface FIFOs 1010, e.g., twenty interface FIFOs having a total of 16 KBytes. The slot generator 1006 generates slots based on interface bandwidth requirements. The slot generator 1006 can be programmed to divide up the bandwidth usage as appropriate. A credit mechanism can be utilized to prevent overflows at the interface FIFOs 1010. The SGMII interface 1004 is provided to receive control/management input to the system.

The packet data is read from the interface FIFOs 1010 into a receive buffer (RX buffer 1020). In the current example, the Rx Buffer is carved into 524 "contexts", where a context refers to a separation of the incoming packet streams, e.g., based at least in part on physical input ports and/or stateless packet parsing, such as VLAN-priority for Ethernet interface or the channel number for an Interlaken interface. The packets from the interface FIFOs 1010 can be mapped into the different FIFOs within the RX buffer 1020. For example, a given packet in an interface FIFO may be mapped to a base 0/1 set of RX FIFOs 1011 in the RX buffer 1020.

An arbiter 1022 acts as a scheduler to read packet data from the RX buffer 1020 and to feed the packet data for parsing to parser 1028. Any suitable scheduling algorithm may be employed at the arbiter 1022. For example, a round-robin approach can be taken to read out of the Rx Buffer 1020. Interface masking may also be applied to direct packets from specific interfaces to specific micro-cores in the parser 1028. In addition, scheduling by the arbiter 1022 may also be dependent upon available of hardware resources and free descriptors. Before being considered eligible for scheduling, the total Rx bytes in a context should be greater than a programmable threshold or an end-of-packet (EOP) indication for that section should be present in the Rx buffer.

The parser sequencer 1016 receives control information for the packets. For example, the parser sequencer may receive information about the packets such as the length or start address of the packets. This information is used by the arbiter 1022 to schedule reads of packet data from the RX buffer 1020 into the parsers.

A hardware parser 1024 may be employed to perform parsing on the packet data, in conjunction with the activities of the micro-core parser 1028. For example, the hardware parser 1024 may be used to generate a classification key for each incoming packet. The classification key for the incoming packet is sent to one of the programmable micro-cores in the micro-core parser 1028 for any extra classification processing that may be needed.

In some embodiments, the micro-cores within the micro-core parser 1028 are fully programmable processors, as described in more detail below. The programmability of these micro-core processors allows for great flexibility and expansion of the capabilities of the system to perform packet parsing.

As data moves from the RxBuffer 1020 to the parser 1028 and DMA 1036, the Rx descriptor generator 1032 detects when a packet crosses a page boundary. When a start of packet (SOP) indication is received, or when a packet crosses a page boundary, the Rx descriptor generator 1032 generates a new free descriptor from the free descriptor queue 1014 and sends the pointer to DMA 1036. Packet descriptors for the same packet can be from the same Free Descriptor Queue 1014. The DMA block 1036 will pre-pad information to the packet buffer and store the packet data via an I/O distributed Interconnect. The Rx descriptor generator 1032 also adds the new descriptor to a descriptor list. The RX descriptor generator 1032 may also create a descriptor that points to the list of descriptors where the packet was stored and sends this descriptor along with the Flow ID, Class ID, and other control information 1038 to the Packet Ordering Engine (POE) 1040.

The free descriptor queue 1014 accepts messages over the messaging network 1012 for returning the freed packet descriptors. Descriptors pointing to the packet data are sent to the Packet Ordering Engine (POE) 1040. The POE 1040, in turn, appends its own information to the front of the messages and forwards them to a host processor/processor core.

The packet data may be processed by certain specialized processing engines 1034. For example, checksumming or CRC processing may occur at engines 1034. These activities may be controlled based on instructions from the micro-cores in the micro-core parser 1028. In addition, CRC key hashing may be performed at block 1030, which provide a flow identifier to the RX descriptor generator 1032.

Figure 11:
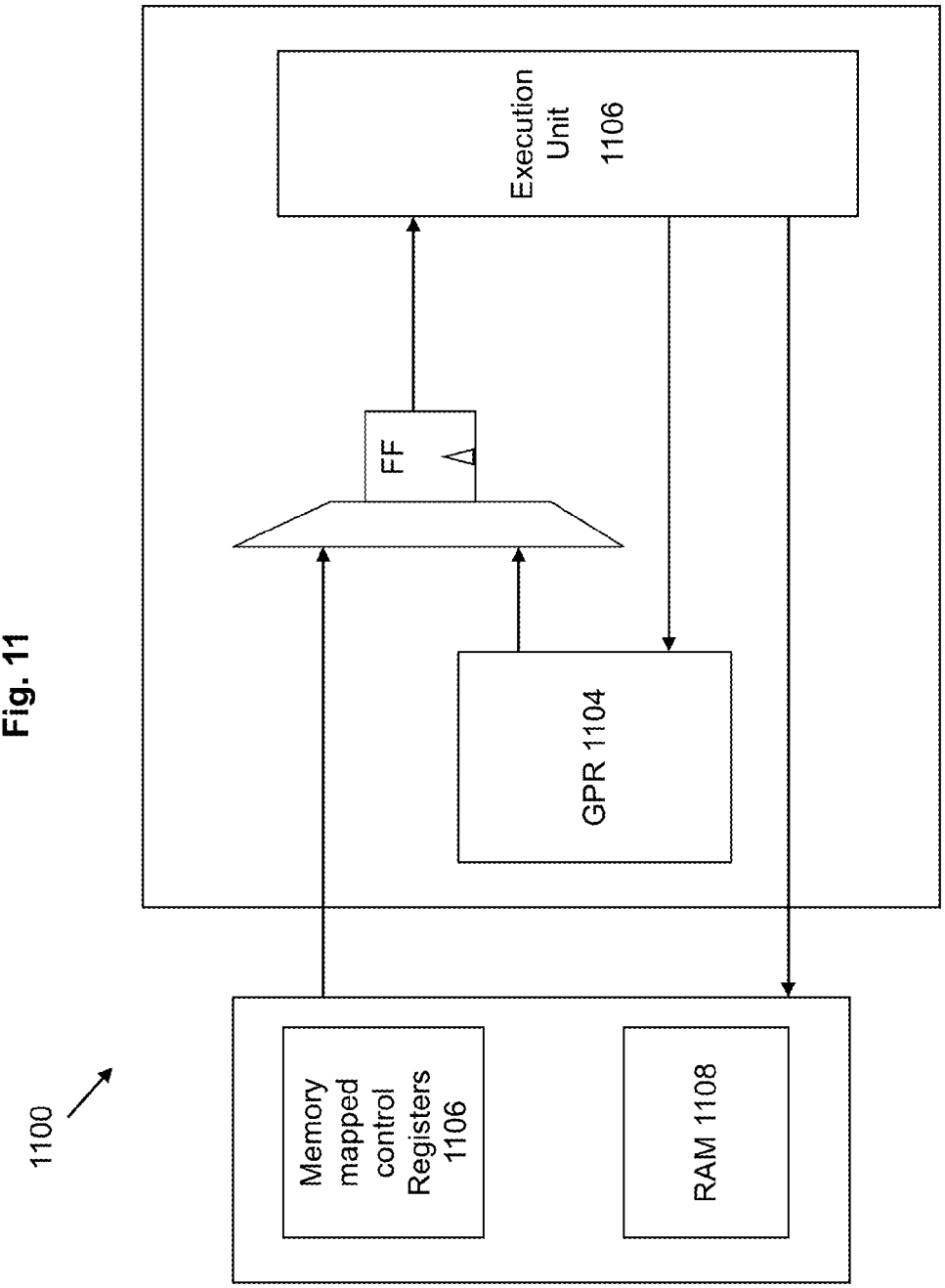
FIG. 11 illustrates the architecture of an example micro-core.

FIG. 11 shows a diagram of a micro-core architecture 1100 according to some embodiments. The micro-core architecture 1100 provides a framework that not only has a small silicon footprint, but also contains enough processing and expansion capability to support packet processing tasks. In some embodiments, the micro-core architecture 1100 is compliant with standard and/or well known specifications and instruction sets. For example, the micro-core architecture 1100 can be implemented to support the MIPS32 Release2 user space instruction set.

The micro-core architecture 1100 in some embodiments is a five pipe stage, single issue 32-bit processor unit 506, which supports CISC-style enhanced instructions that perform simple ALU functions directly on data stored in memory as well as register files, and can write processing result either to the register file or memory. The memory and registers include a general purpose register (GPR) 1104, as well as a RAM 1108 that may be incorporated either as part of the micro-core or external to the micro-core. The registers within the micro-core may be used to communicate information to the micro-core about the current incoming packet. The registers may also be used by the micro-core to communicate specific tasks for downstream hardware to conduct on the current packet. A memory mapped control register 1106 provides management and control functionality over the micro-core architecture 1100. In some embodiments, the control register 1106 and RAM 1108 are not located within the micro-core itself.

The data is copied into the GPR 1104 for processing by the execution unit 1106. In some embodiments, the data is divided into multiple segments, e.g., where a register of 128 bits is divided into four segments of 32 bits each. This implementation for the micro-core provides for very efficient processing, since the packet data can therefore be operated upon on a segment basis. If some portion of the data is needed, the micro-core only needs to read in the necessary segment(s), modify or operate upon just that portion of the data, and then write it back to memory. The micro-core operates over multiple stages, including (a) instruction fetch (IF); (b) instruction decode (ID); (c) register memory read (REG/MEM1); (d) execute/address generation (EXEC/AGN); and (e) memory writeback (WRB/MEM1).

Figure 12:
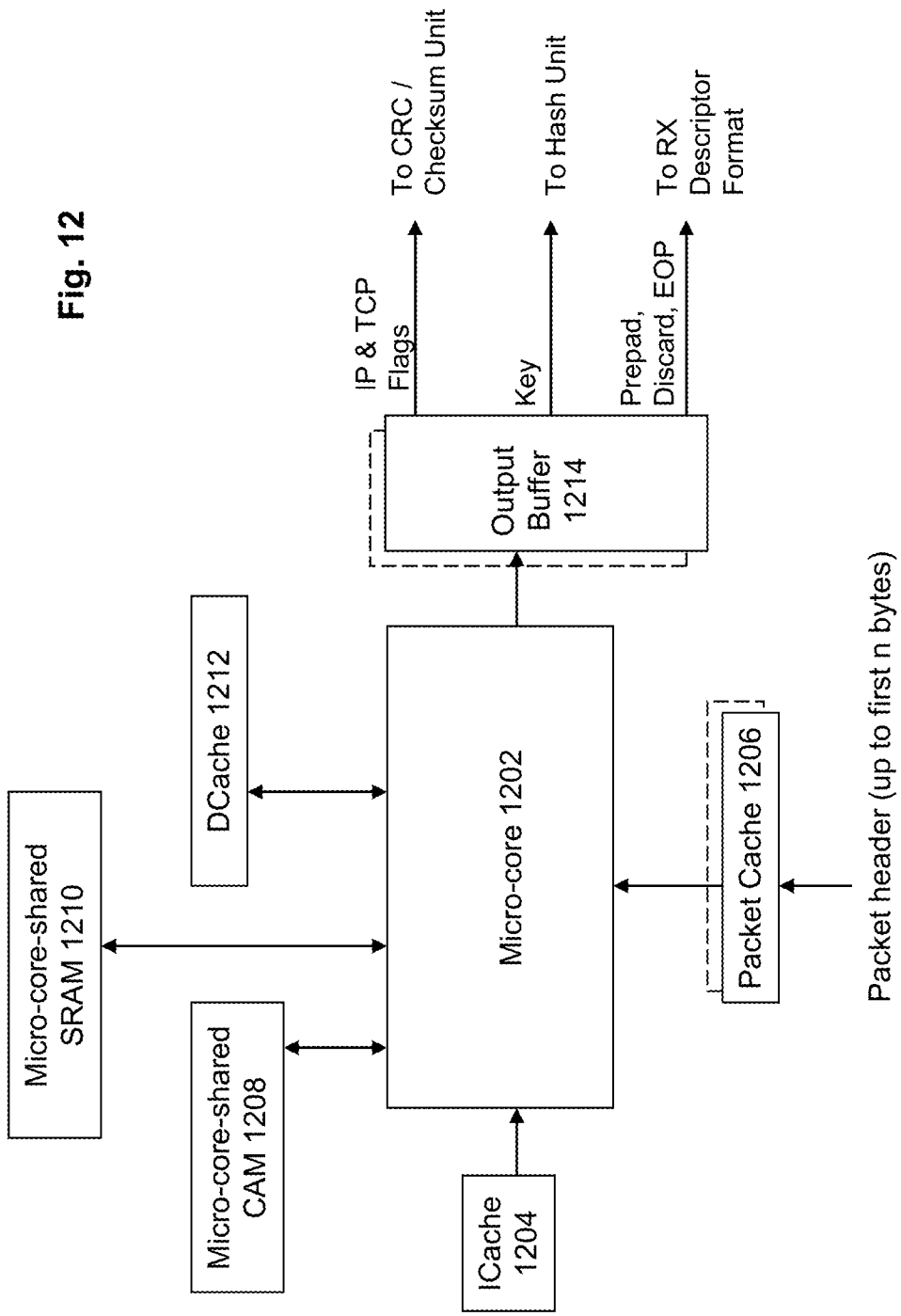
FIG. 12 illustrates functional components of an example micro-core.

FIG. 12 shows functional components of a micro-core 1202 when implemented within an ingress path subsystem, according to some embodiments. An instruction cache 1204 (e.g., a 4 KB cache) is employed to hold instructions for the micro-core 1202. One or more packet caches 1206 are employed to hold packet header data to be processed by the micro-core 1202. In some embodiments, two separate packet caches 1206 (e.g., 512 KB data caches) may be utilized to maintain a constant set of data ready to be processed by the micro-core 1202. A content addressable memory (CAM) 1208 (e.g., a 3 KB CAM) may be shared across multiple micro-cores 1202. The CAM 1208 may be used to implement a dependency list structure according to some embodiments; alternatively, the dependency list is implemented in a separate CAM (not shown). The micro-core 1202 may also be associated with a shared memory 1210 (e.g., 32 KB shared SRAM) and DCache 1212 (e.g., 512 KB DCache). The Shared RAM (1210) and the Shared CAM can be used to store state data, such as a forwarding table. The D-Cache (1212) is used to store local-variables, if they do not fit inside the GPR.

One or more output buffers 1214 may be used to hold the outputs from the micro-core 1202. These outputs include, for example, IP and TCP/IP flags that are sent to a CRC or checksum block. The output may also include a key that is sent to a hash logic unit. In addition, the micro-core 1202 may output information (e.g., a prepad, discard, or EOP) that is used by a RX descriptor generator to generate descriptors. The output can also be the destination for the message. The destination can be either a CPU (main host CPU) or can be a Transmit queue inside NAE. In case it is a transmit queue, then the packet will be sent out without host CPU intervention.

Therefore, what has been described is an improved approach for implementing a flexible parser for a networking system, where the parser includes one or more micro-cores to process packets in a networking system. The micro-cores of the parser read the packet headers, and perform any suitably programmed tasks upon those packets and packet headers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A system for processing packets, comprising:
   a plurality of micro-cores configured to process the packets; and
   a memory to store a dependency list comprising a structure configured to maintain an order in which the packets are to be processed and released,
   wherein the dependency list comprises a plurality of rows and a plurality of columns,
   wherein each micro-core of the plurality of micro-cores is associated with a corresponding row from among the plurality of rows and a corresponding column from among the plurality of columns,
   wherein the corresponding row is configured to hold data identifying whether a given packet associated with the corresponding row has dependencies on one or more other packets, and
   wherein the corresponding column is configured to hold data identifying whether a given packet associated with the corresponding column creates dependencies for one or more other packets.

2. The system of claim 1, wherein the structure is further configured to hold a bit vector associated with a packet, from among the packets, that is being processed by a micro-core from among the plurality of micro-cores, wherein bits in the bit vector identify an existence of a dependency.

3. The system of claim 1, wherein the memory comprises content addressable memory.

4. A method to maintain ordering when processing packets, comprising:
   using a plurality of micro-cores to process the packets; and
   maintaining an order in which the packets are to be processed and released using a dependency list stored in a memory, the dependency list comprising a structure having a set of rows and a set of columns to maintain the order in which the packets are to be processed and released,
   wherein each micro-core from the plurality of micro-cores is associated with both a corresponding row from the set of rows and a corresponding column from the set of columns,
   wherein the corresponding row holds data identifying whether a given packet associated with the corresponding row has dependencies on one or more other packets, and
   wherein the corresponding column holds data identifying whether a given packet associated with the corresponding column creates dependencies for one or more other packets.

5. The method of claim 4, wherein the corresponding row holds a bit vector associated with a packet, from among the packets, that is being processed by a micro-core from among the plurality of micro-cores,
   wherein bits in the bit vector identify an existence of a dependency.

6. The method of claim 5, wherein each bit of the bit vector corresponds to the dependency for a different packet.

7. The method of claim 4, further comprising:
   receiving a packet from among the packets for processing by a micro-core from among the plurality of micro-cores;
   associating the corresponding row with the micro-core; and
   adding a value in the corresponding row to indicate whether the packet has a dependency on another packet.

8. The method of claim 7, wherein the value comprises a bit vector with bit values that correspond to rows from among the set of rows associated with other micro-cores from among the plurality of micro-cores.

9. The method of claim 4, further comprising:
   receiving a request to release a packet, from among the packets, that was processed by a micro-core from among the plurality of micro-cores;
   checking a row from the set of rows associated with the micro-core to identify a dependency for the packet on another packet from among the packets; and
   releasing the packet if the dependency is not identified.

10. The method of claim 9, wherein a bit vector in the row is checked to identify a value indicating the dependency.

11. The method of claim 9, wherein a second packet from among the packets is dependent on the packet, and a second row from among the set of rows is associated with the second packet,
    wherein a value in the second row indicates a dependency of the second packet on the packet, and wherein release of the packet causes a value in the second row to be modified to indicate no further dependency on the packet.

12. The system of claim 1, wherein, based on the dependency list, the plurality of micro-cores is configured to release a later packet from among the packets from a flow after an earlier packet, from among the packets, from the flow has been processed.

* * * * *

UNITED STATES PATENT AND TRADEMARK OFFICE
CERTIFICATE OF CORRECTION

PATENT NO.       : 9,244,798 B1
APPLICATION NO.  : 13/164533
DATED            : January 26, 2016
INVENTOR(S)      : Kuila et al.

Page 1 of 1

It is certified that error appears in the above-identified patent and that said Letters Patent is hereby corrected as shown below:

Claims

In column 16, line 32, Claim 12 replace "later packet from" with --later packet, from--.
In column 16, line 32, Claim 12 replace "flow after" with --flow, after--.
In column 16, line 33, Claim 12 replace "packets, from the flow has" with --packets from the flow, has--.

Signed and Sealed this
Twenty-sixth Day of April, 2016

Michelle K. Lee
*Director of the United States Patent and Trademark Office*